(12) United States Patent
Bosworth et al.

(10) Patent No.: US 10,509,415 B2
(45) Date of Patent: Dec. 17, 2019

(54) AIRCREW AUTOMATION SYSTEM AND METHOD WITH INTEGRATED IMAGING AND FORCE SENSING MODALITIES

(71) Applicant: Aurora Flight Sciences Corporation, Manassas, VA (US)

(72) Inventors: William Bosworth, Cambridge, MA (US); Devin Richard Jensen, Cambridge, MA (US); Margaret Reagan, Cambridge, MA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 84 days.

(21) Appl. No.: 15/661,149

(22) Filed: Jul. 27, 2017

(65) Prior Publication Data

US 2019/0033888 A1 Jan. 31, 2019

(51) Int. Cl.

| | | |
|---|---|---|
| G01L 5/22 | (2006.01) | |
| G01L 5/00 | (2006.01) | |
| G05D 1/08 | (2006.01) | |
| B64D 43/00 | (2006.01) | |
| G06K 9/78 | (2006.01) | |
| G06K 9/20 | (2006.01) | |

(Continued)

(52) U.S. Cl.
CPC .......... *G05D 1/0808* (2013.01); *B64C 13/08* (2013.01); *B64D 43/00* (2013.01); *G01C 21/00* (2013.01); *G01L 5/0028* (2013.01); *G01L 5/0061* (2013.01); *G05D 1/0088* (2013.01); *G05D 1/101* (2013.01); *G06K 9/00832* (2013.01); *G06K 9/209* (2013.01); *G06K 9/6202* (2013.01); *G06K 9/78* (2013.01); *G01L 5/00* (2013.01); *G06F 3/02* (2013.01); *G06F 3/0483* (2013.01); *G06F 3/0488* (2013.01); *G06F 3/04817* (2013.01)

(58) Field of Classification Search
CPC ........ B25J 9/1605; B25J 9/16; B25J 11/0045; B65D 81/18; A47J 47/02; A47B 77/08; A47B 77/16; G05B 2219/45111
USPC ....... 701/3, 36; 414/735; 700/245, 248, 258, 700/260; 901/8
See application file for complete search history.

(56) References Cited

U.S. PATENT DOCUMENTS

| | | |
|---|---|---|
| 4,063,073 A | 12/1977 | Strayer |
| 5,157,615 A | 10/1992 | Brodegard et al. |

(Continued)

FOREIGN PATENT DOCUMENTS

| | | |
|---|---|---|
| EP | 2251851 | 11/2010 |
| WO | 2016/035002 | 3/2016 |

OTHER PUBLICATIONS

Pint-sized military UAV engine's tele-adjusting arm based on force feedback; Changliang Liu et al.; 2010 2nd International Asia Conference on Informatics in Control, Automation and Robotics (CAR 2010); vol. 2; pp. 205-209;IEEE Conferences; year 2010.*

(Continued)

*Primary Examiner* — Cuong H Nguyen

(74) *Attorney, Agent, or Firm* — Michael Stanley Tomsa; McAndrews, Held & Malloy, Ltd.; Eugene H. Nahm

(57) ABSTRACT

An aircrew automation system relates to the field of flight control systems, methods, and apparatuses; even more particularly, to a system, method, and apparatus for providing aircraft state monitoring and/or an automated aircrew employing a robotic arm with integrated imaging and force sensing modalities.

20 Claims, 15 Drawing Sheets

(51) Int. Cl.

| | | |
|---|---|---|
| G06K 9/62 | (2006.01) | |
| G06K 9/00 | (2006.01) | |
| B64C 13/08 | (2006.01) | |
| G01C 21/00 | (2006.01) | |
| G05D 1/00 | (2006.01) | |
| G05D 1/10 | (2006.01) | |
| G06F 3/0488 | (2013.01) | |
| G06F 3/02 | (2006.01) | |
| G06F 3/0483 | (2013.01) | |
| G06F 3/0481 | (2013.01) | |

(56) References Cited

U.S. PATENT DOCUMENTS

| | | | |
|---|---|---|---|
| 5,283,643 A | 2/1994 | Fujimoto | |
| 6,480,152 B2 | 11/2002 | Lin et al. | |
| 6,604,044 B1 | 8/2003 | Kirk | |
| 6,820,006 B2 | 11/2004 | Patera | |
| 6,993,420 B2 | 1/2006 | Le Draoullec et al. | |
| 7,106,219 B2 | 9/2006 | Pearce | |
| 7,176,830 B2 | 2/2007 | Horibe | |
| 7,193,729 B1 | 3/2007 | Li | |
| 7,203,630 B2 | 4/2007 | Kolb et al. | |
| 7,437,220 B2 | 10/2008 | Stefani | |
| 7,624,943 B2 | 12/2009 | Cerchie et al. | |
| 7,650,232 B1 | 1/2010 | Paielli | |
| 7,784,741 B2 | 8/2010 | Cerchie et al. | |
| 7,848,698 B2 | 12/2010 | Batcheller et al. | |
| 7,954,965 B1 | 6/2011 | Boyd | |
| 8,026,827 B1 | 9/2011 | Boyd et al. | |
| 8,049,658 B1 | 11/2011 | Lagonik et al. | |
| 8,052,096 B2 | 11/2011 | Cerchie et al. | |
| 8,170,719 B2* | 5/2012 | Tsusaka | B25J 9/1633 700/257 |
| 8,175,749 B2* | 5/2012 | Tsusaka | B25J 9/1633 700/254 |
| 8,290,638 B2 | 10/2012 | Eicke et al. | |
| 8,306,672 B2 | 11/2012 | Nickolaou | |
| 8,319,665 B2 | 11/2012 | Weinmann et al. | |
| 8,319,666 B2 | 11/2012 | Weinmann et al. | |
| 8,346,480 B2 | 1/2013 | Trepagnier et al. | |
| 8,373,751 B2 | 2/2013 | Han et al. | |
| 8,401,702 B2* | 3/2013 | Okazaki | A61G 7/1017 700/257 |
| 8,411,145 B2 | 4/2013 | Fardi | |
| 8,466,827 B2 | 6/2013 | Nanami | |
| 8,504,223 B2 | 8/2013 | Boorman et al. | |
| 8,616,883 B2 | 12/2013 | Wokurka | |
| 8,616,884 B1 | 12/2013 | Lechner et al. | |
| 8,768,534 B2 | 7/2014 | Lentz | |
| 9,052,393 B2 | 6/2015 | Kriel et al. | |
| 9,097,801 B2 | 8/2015 | Kambe et al. | |
| 9,202,098 B2 | 12/2015 | Lewis et al. | |
| 9,507,021 B2 | 11/2016 | Lynam | |
| 2002/0004695 A1* | 1/2002 | Glenn | G07C 5/0891 701/32.2 |
| 2005/0151025 A1 | 7/2005 | Mendelson et al. | |
| 2006/0182603 A1* | 8/2006 | Hawes | B25J 15/0253 414/735 |
| 2006/0209019 A1* | 9/2006 | Hu | G06F 3/016 345/156 |
| 2007/0066918 A1* | 3/2007 | Dewald | A61H 1/02 601/5 |
| 2007/0236366 A1 | 10/2007 | Gur et al. | |
| 2008/0267737 A1* | 10/2008 | Hatanaka | B25J 9/1687 414/1 |
| 2008/0316010 A1 | 12/2008 | Chang | |
| 2009/0198392 A1 | 8/2009 | Eicke et al. | |
| 2009/0295602 A1 | 12/2009 | Cernasov et al. | |
| 2009/0308603 A1* | 12/2009 | Borgstadt | B25J 9/1664 166/250.15 |
| 2010/0300230 A1* | 12/2010 | Helmer | B25J 9/106 74/469 |
| 2011/0015787 A1* | 1/2011 | Tsusaka | B25J 9/0003 700/264 |
| 2011/0149067 A1 | 6/2011 | Lewis et al. | |
| 2011/0160950 A1 | 6/2011 | Naderhirn et al. | |
| 2011/0171611 A1 | 7/2011 | Batcheller et al. | |
| 2011/0178638 A1* | 7/2011 | Tsusaka | B25J 9/1633 700/257 |
| 2011/0190932 A1* | 8/2011 | Tsusaka | B25J 13/08 700/254 |
| 2011/0256995 A1* | 10/2011 | Takazakura | B25J 15/04 483/7 |
| 2011/0288773 A1 | 11/2011 | Hoy | |
| 2013/0138272 A1* | 5/2013 | Louise-Babando | G05D 1/10 701/14 |
| 2013/0172902 A1* | 7/2013 | Lightcap | A61B 5/04001 606/130 |
| 2014/0080099 A1 | 3/2014 | Sowadski et al. | |
| 2014/0210648 A1 | 7/2014 | Samuthirapandian et al. | |
| 2015/0094982 A1 | 4/2015 | Dupont De Dinechin | |
| 2015/0323932 A1 | 11/2015 | Paduano et al. | |
| 2015/0339929 A1 | 11/2015 | Hedrick et al. | |
| 2016/0019793 A1 | 1/2016 | Fournier et al. | |
| 2016/0059412 A1* | 3/2016 | Oleynik | B25J 9/163 700/257 |
| 2016/0124429 A1 | 5/2016 | Schultz | |
| 2016/0264254 A1 | 9/2016 | Jajur et al. | |
| 2016/0275802 A1 | 9/2016 | Loegering | |
| 2017/0084183 A1 | 3/2017 | Knox | |
| 2017/0252115 A1* | 9/2017 | Stoianovici | A61B 34/70 |
| 2017/0267331 A1 | 9/2017 | Schultz | |
| 2017/0348854 A1* | 12/2017 | Oleynik | B25J 9/1605 |

OTHER PUBLICATIONS

A general low-cost and flexible architecture for robotized drilling in aircraft assembly lines; A. Marino et al.; 2016 International Symposium on Power Electronics, Electrical Drives, Automation and Motion (SPEEDAM); pp. 1401-1408; IEEE Conferences; year 2016.*

A prototype of aerial manipulator; A.Torre et al.; 2012 IEEE/RSJ International Conference on Intelligent Robots and Systems; pp. 2653-2654; IEEE Conference; Year: 2012.*

Windshield cleaning robot system: WSC; T. Matsumaru et al.; Proceedings of IEEE/RSJ International Conference on Intelligent Robots and Systems (IROS'94); vol. 3; pp. 1964-1971 vol. 3; IEEE Conferences; year: 1994.*

Aurora Flight Sciences; Centaur Optionally-Piloted Aircraft brochure.

Day, Carole; Your (robot) captain speaking; The Australian Financial Review; Aug. 20, 2016.

Jeong, Heejin, et al.; A Robot-Machine Interface for Full-functionality Automation using a Humanoid; 2014 IEEE/RSJ International Conference on Intelligent Robots and Systems (IROS 2014); Sep. 14-18, 2014, Chicago, IL.

Markoff, John; A Machine in the Co-Pilot's Seat; The New York Times; Jul. 20, 2015.

International Search Report and Written Opinion, dated Jun. 21, 2017, in International application No. PCT/US2017/023523, filed Mar. 22, 2017.

Extended European Search Report in European application No. 18184925.8, dated Jan. 30, 2019.

Szondy, David: "DARPA robot lands (simulated) Boeing 737" (May 18, 2017), XP002787446, https://newatlas.com/darpa-robot-boeing-737-landing-simulator/49580/ [retrieved on Dec. 14, 2018.]

Aurora Flight Sciences: "Robotic Co-Pilot Flies and Lands a Simulated Boeing 737" (May 16, 2017), XP054978975, https://www.youtube.com/watch?v=om18cOWFL3Q [retrieved on Dec. 14, 2018].

Aurora: "Alias Advanced Automation to Enable Reduced Crew Operations Aircrew Labor In-Cockpit Automation System Artist's Concept", (Oct. 15, 2016), XP055534900, http://www.aurora.aero/wp-content/uploads/2016/10/ALIAS-Brochure_X8.pdf [retrieved on Dec. 14, 2018].

(56) References Cited

OTHER PUBLICATIONS

"AI Just "Landed" a Boeing 737 for the First Time by Itself" (Jun. 28, 2017) https://bigthink.com/robby-berman/ai-just-landed-a-boeing-737-for-the-first-time-by-itself [retrieved on Dec. 3, 2018].

"Answer: Fly your plane; Question: Who or what is CARNAC?" (Jun. 22, 2017), https://www.therobotreport.com/answer-fly-your-plane-question-who-or-what-is-carnac/ [retrieved on Dec. 3, 2018].

"Inside Darpa's Plan to Make Old Aircraft Autonomous With Robot Arms" (Jun. 11, 2016), https://www.wired.com/2016/11/darpa-alias-autonomous-aircraft-aurora-sikorsky/ [retrieved on Dec. 3, 2018].

"Pilotless planes may be landing at airports by 2020" (Dec. 6, 2016), https://www.geo.tv/latest/122825-Pilotless-planes-may-be-landing-at-airports-by-2020 [retrieved on Dec. 3, 2018].

""Siri, Land the Plane"" (May 26, 2017), https://www.airspacemag.com/daily-planet/meet-your-new-copilot-robotic-arm-180963469/ [retrieved on Dec. 3, 2018].

Extended European search report, in European application No. 18184925.8, dated Apr. 30, 2019.

Extended European Search Report, dated Dec. 13, 2018, in European application No. 18183666.9.

\* cited by examiner

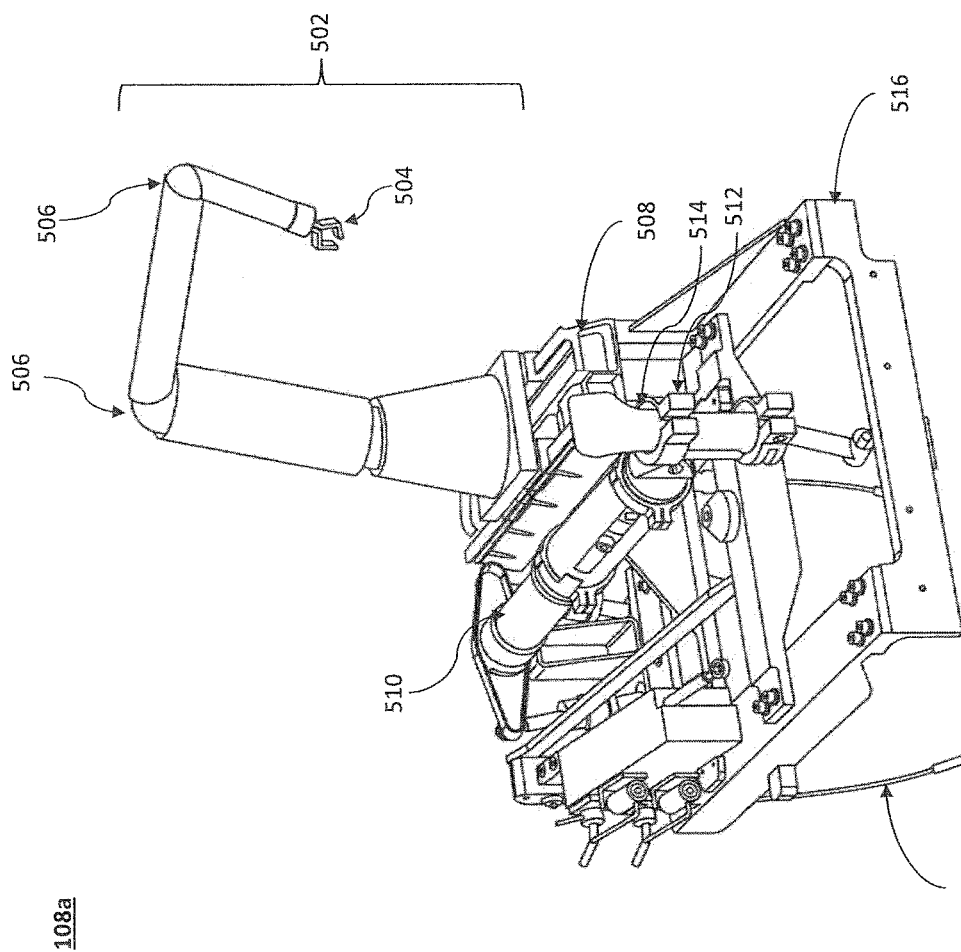

AIRCREW AUTOMATION SYSTEM AND METHOD WITH INTEGRATED IMAGING AND FORCE SENSING MODALITIES

STATEMENT OF GOVERNMENT INTEREST

This invention was made with government support under Contract Number: HR0011-15-C-0027 awarded by the Defense Advanced Research Projects Agency (DARPA). The government has certain rights in the invention.

TECHNICAL FIELD

The present disclosure relates to the field of flight control systems, methods, and apparatuses; even more particularly, to a system, method, and apparatus for providing aircraft state monitoring and/or an automated aircrew employing a robotic arm with integrated imaging and force sensing modalities.

BACKGROUND

Recent experience with automation in cockpits has shown that prior approaches of adding additional functionality to flight decks increases complexity, causes overreliance on automation, and may not necessarily reduce workload, especially during critical situations. An additional challenge is that avionics manufacturers have instituted strict requirements-based design and change orders for any desired improvements, in order to provide high reliability and verifiability. Thus, conversion of legacy aircraft is generally cost prohibitive and requires a large capital investment in requirements, verification, and testing.

Aurora Flight Sciences Corporation of Manassas, Va. has previously developed a right-seat pilot assistant capable of operating a Diamond DA42 Twin Star during takeoff, cruise, and landing. The right-seat pilot assistant, called Centaur, can be installed into, and removed from, the DA42 without affecting the original type certificate, thus maintaining the aircraft's original certification. Centaur includes mechanical actuation of the primary flight controls and its own avionics suite, and may be used with a pilot in a supervisory role or as a fully unmanned aircraft. For example, Centaur may be flown by an operator in the back seat of the airplane, directing the flight plan on a laptop. While Centaur offers many features, it suffers from certain drawbacks. In particular, (1) the Centaur hardware is not portable to other aircraft, nor is the software plug-and-pay extensible to other capabilities; (2) parts of the Centaur system are invasive and require cutting into existing avionics wiring in a manner very specific to the aircraft (i.e., the DA42); (3) Centaur does not allow the onboard pilot to be the operator and to perform tasks such as directing the flight plan; and (4) Centaur does not acquire knowledge about the aircraft it is operating.

Thus, a need exists for an open architecture system that enables quick introduction of new capabilities, increases safety, grows functionality, and reduces pilot workload—without large expense or recertification. There is also a need to provide a pilot with continuous aircraft state monitoring and information augmentation, which can effectively serve as a digital flight engineer. An aircrew automation system, such as is disclosed herein, addresses these needs and enables new capabilities to be rapidly introduced with minimal certification burden while being portable across airframes (e.g., via temporary installations). As will be discussed, the aircrew automation system can provide significant benefit to a variety of end-users. An example application includes the operation of aircraft where fatigue and boredom can cause a reduction in crew attentiveness, in which case the aircrew automation system reduces risk in a flight operation by alerting the pilot and, in certain instances, assuming control of the aircraft. Other example applications exist where the potential for human error currently limits extensive use of aircraft (e.g., low-altitude operations), synchronized operations, unmanned flights, unmanned formations with manned flight lead, and improved debrief capabilities due to comprehensive data logging.

SUMMARY OF THE INVENTION

The present disclosure is directed to flight control systems, methods, and apparatuses; even more particularly, to a system, method, and apparatus for providing aircraft state monitoring and/or automated aircrew employing a robotic arm with integrated imaging and force sensing modalities.

According to a first aspect, an aircrew automation system for use in an aircraft comprises: a core platform configured to: operatively connect a plurality of systems or subsystems via one or more interfaces; and communicate commands to a flight control system of the aircraft based at least in part on flight situation data; an actuation system operatively coupled with the core platform to execute the commands and collect data, the actuation system comprising: an optical sensor configured to visually identify one or more cockpit instruments corresponding to the flight control system; a force sensor configured to measure a force when the actuation system makes contact with the one or more cockpit instruments; and a data acquisition system to map the location, type, and position of the one or more cockpit instruments based on the data collected by the optical sensor and the force sensor.

In certain aspects, the optical sensor is a one of an infrared camera and a visual (optical) camera.

In certain aspects, the force sensor comprises one or more digits that are individually manipulable by the controller.

In certain aspects, each digit comprises a respective force sensor.

In certain aspects, the actuation system comprises a robotic arm configured to maneuver in six degrees of freedom within a cockpit environment.

In certain aspects, optical sensor and the force sensor are collocated at a distal end of the robotic arm, the distal end being configured to image and contact the one or more cockpit instruments.

In certain aspects, the aircrew automation system further comprises a knowledge acquisition system operatively coupled with the core platform to determine information specific to the aircraft.

In certain aspects, the knowledge acquisition is configured to access a matrix of force values corresponding to a force profile of the one or more cockpit instruments.

In certain aspects, the controller is configured to compare measured data from the force sensor to the matrix of force values to identify a cockpit instruments of the one or more cockpit instruments based on a respective force profile.

In certain aspects, the knowledge acquisition is configured to access a matrix of image data corresponding to a layout of the one or more cockpit instruments.

In certain aspects, the controller is configured to compare measured data from the optical sensor to the matrix of image data to identify a cockpit instruments of the one or more cockpit instruments based on a location of the cockpit instrument according to the layout.

In certain aspects, the aircrew automation system further comprises a perception system operatively coupled with the core platform to monitor the one or more cockpit instruments of the aircraft to generate flight situation data.

In certain aspects, the aircrew automation system further comprises a human machine interface operatively coupled with the core platform to provide an interface between a pilot and the aircrew automation system to display data to and accept commands from the pilot.

In certain aspects, the human machine interface includes a touch screen display.

In certain aspects, the actuation system is configured with a multi-tool at the distal end configured to interact with a corresponding instrument of the one or more cockpit instruments.

According to a second aspect, a method of implementing an aircrew automation system for use in an aircraft comprises: receiving a command to alter the aircraft heading; activating a robotic arm configured to manipulate one or more cockpit instruments; contacting a knob configured to alter the aircraft heading with the robotic arm; determining that a measured force profile for the knob contact matches a stored force profile value; and turning the knob to reflect the commanded heading.

In certain aspects, the method further comprises reading a first heading before contacting the knob.

In certain aspects, the method further comprises calculating an amount of change required to achieve the commanded heading based on the reading of the first heading and the commanded heading.

In certain aspects, the method further comprises: reading a second heading after turning the knob; and comparing the second heading to the commanded heading, In certain aspects, the method further comprises: determining the second heading does not match the commanded heading; and calculating a second amount of change required to achieve the commanded heading based on the reading of the second heading and the commanded heading.

DESCRIPTION OF THE DRAWINGS

These and other advantages of the present disclosure may be readily understood with the reference to the following specifications and attached drawings wherein:

FIG. 1b illustrates an example flow of information data between the subsystems of FIG. 1a.

FIGS. 5a and 5b illustrate an example primary actuation system.

FIG. 7b illustrates an example reformatted image of the image of FIG. 7a.

DETAILED DESCRIPTION

Figure 1A:
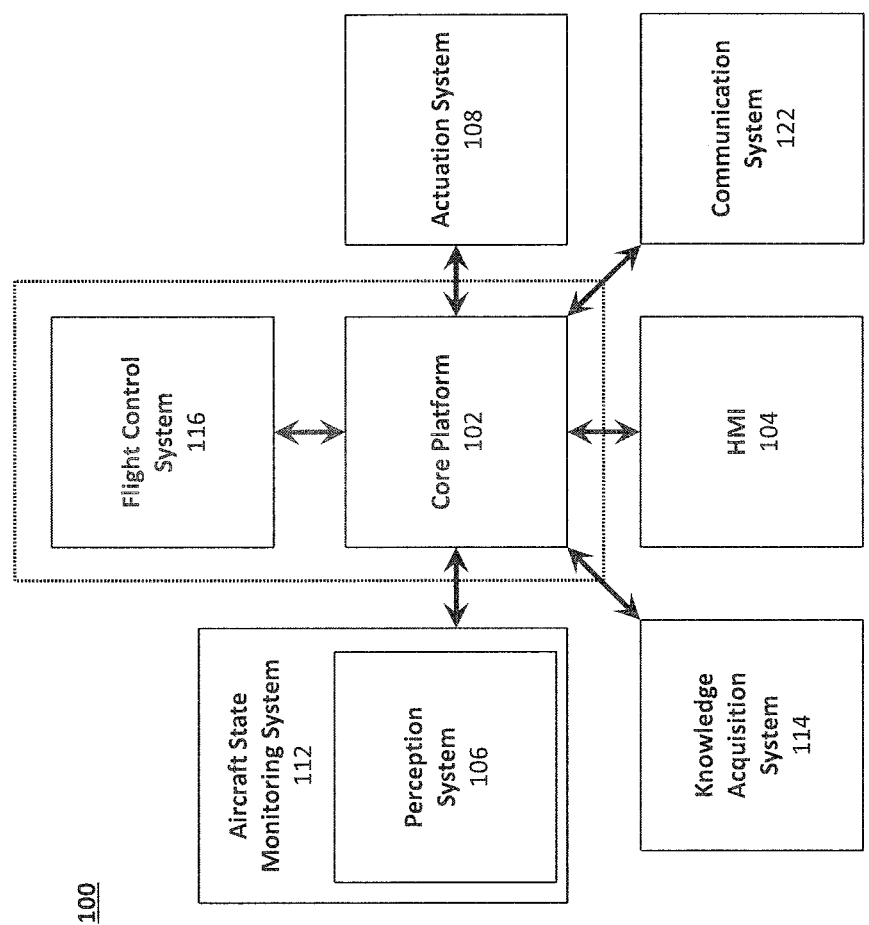
FIG. 1a illustrates a block diagram of an example aircrew automation system.

Preferred embodiments of the present disclosure may be described hereinbelow with reference to the accompanying drawings. In the following description, well-known functions or constructions are not described in detail because they may obscure the disclosure in unnecessary detail. For this disclosure, the following terms and definitions shall apply.

As utilized herein the terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

As used herein, the words "about" and "approximately," when used to modify or describe a value (or range of values), mean reasonably close to that value or range of values. Thus, the embodiments described herein are not limited to only the recited values and ranges of values, but rather should include reasonably workable deviations. As utilized herein, circuitry or a device is "operable" to perform a function whenever the circuitry or device comprises the necessary hardware and code (if any is necessary) to perform the function, regardless of whether performance of the function is disabled, or not enabled (e.g., by a user-configurable setting, factory trim, etc.).

As used herein, the terms "aerial vehicle" and "aircraft" refer to a machine capable of flight, including, but not limited to, both traditional runway and vertical takeoff and landing ("VTOL") aircraft. VTOL aircraft may include fixed-wing aircraft (e.g., Harrier jets), rotorcraft (e.g., helicopters), and/or tilt-rotor/tilt-wing aircraft.

As used herein, the terms "communicate" and "communicating" refer to (1) transmitting, or otherwise conveying, data from a source to a destination, and/or (2) delivering data to a communications medium, system, channel, network, device, wire, cable, fiber, circuit, and/or link to be conveyed to a destination. The term "database" as used herein means an organized body of related data, regardless of the manner in which the data or the organized body thereof is represented. For example, the organized body of related data may be in the form of one or more of a table, a map, a grid, a packet, a datagram, a frame, a file, an e-mail, a message, a document, a report, a list, or data presented in any other form.

Disclosed herein is a system configured to, inter alia, function as a pilot's assistant (or co-pilot) or flight engineer. Such an aircrew automation system may be configured to operate an aircraft from takeoff to landing, automatically executing the necessary flight and flight plan activities, checklists, and procedures at the correct phases of flight, while detecting contingencies and responding to them. At the same time, the pilot (e.g., a human pilot or operator) may be continuously informed through an intuitive human-machine interface operatively coupled with the aircrew automation system. That is, the aircrew automation system may provide real-time information and/or feedback to the pilot. For example, the aircrew automation system may indicate a state of the aircraft relative to the procedure being accomplished. The aircrew automation system may be configured to take back control of the aircraft through robotic actuators, if desired.

In doing so, the pilot is enabled to perform tasks best suited for humans, such as high-level decision-making and flight plan planning. Tasks best suited for automation, however, may be handled by the aircrew automation system, including, for example, the manipulation of controls, executing checklists, and monitoring aircraft engine and performance data. Additionally, the aircrew automation system may have the capability to access external information that is either currently unavailable to pilots or that which only comes with experience, such as common system failures for a particular aircraft or how air traffic control commonly routes traffic at a particular airport. The aircrew automation system may be configured to operate as an assistant or as the primary pilot, thereby, if so configured, entirely obviating the need for a human operator. Alternatively, the aircrew automation system may serve to provide a pilot with continuous aircraft state monitoring and information augmentation, without actually taking control of the aircraft. For example, the aircrew automation system may serve as a "second set of eyes" for the pilot, monitoring checklists, instrumentation, engine state, airspace, flight regime, etc.

Unlike existing robotic autopilots and pilot assist systems, which are invasive, require considerable installation expertise, and are aircraft-specific, an aircrew automation system in accordance with an aspect of the present disclosure employs a system architecture and knowledge acquisition system that enables rapid non-invasive installation, which facilitates widespread use and enables the aircrew automation system to be quickly adapted for use in a variety of aircraft. Further, the aircrew automation system's data collection and perception systems are not limited to GPS, accelerations, orientation, and heading, as is the case with existing robotic autopilots. Indeed, the aircrew automation system exceeds the capability of existing data collection and perception systems to better capture aircraft performance by employing both standalone sensors, instrument image data capture (e.g., temperature, altitude, radar, flap angles, etc.), and measuring, detecting, or otherwise receiving pilot inputs. Further, the aircrew automation system's core platform and design of the primary and secondary flight control actuation systems enables portability across a variety of aircraft. Thus, unlike existing robotic autopilots or pilot assist systems, the aircrew automation system may be temporarily installed and readily transferred from aircraft to aircraft, without invasive modification to the aircraft. The aircrew automation system, through its modular design, further reduces the likelihood of designing a single point solution that becomes obsolete as aircraft evolve.

The aircrew automation system's combination of subsystems provides a pilot with high-fidelity knowledge of the aircraft's physical state, and notifies that pilot of any deviations in expected state based on, for example, predictive models. This state awareness may be translated directly into useful information for the pilot, such as alerts to developing emergency conditions, fuel state computation, notification of icing conditions, etc. For example, the aircrew automation system may also serve as a digital flight engineer, thereby advising the pilot by monitoring checklists, instrumentation, engine state, airspace, flight regime, etc.

This ride-along aircrew automation system, which may be non-invasively installed in preexisting aircraft, perceives the state of the aircraft visually and via other sensors, derives the aircraft state vector and other aircraft information, and communicates any deviations from expected aircraft state to the pilot or a control tower. While the aircrew automation system may be non-invasively installed (e.g., via a perception system), it may alternatively be invasive. For example, the aircrew automation system may electronically couple with the cockpit instrument panel (e.g., via the reverse side of the instrument panel) via, for example, the aircraft state monitoring system. Alternatively, the aircrew automation system may be integral and permanently installed during fabrication of the aircraft. In conjunction with an actuation system, the aircrew automation system may further take control of the aircraft and autonomously navigate the aircraft.

System Level Architecture.

Figure 1B:
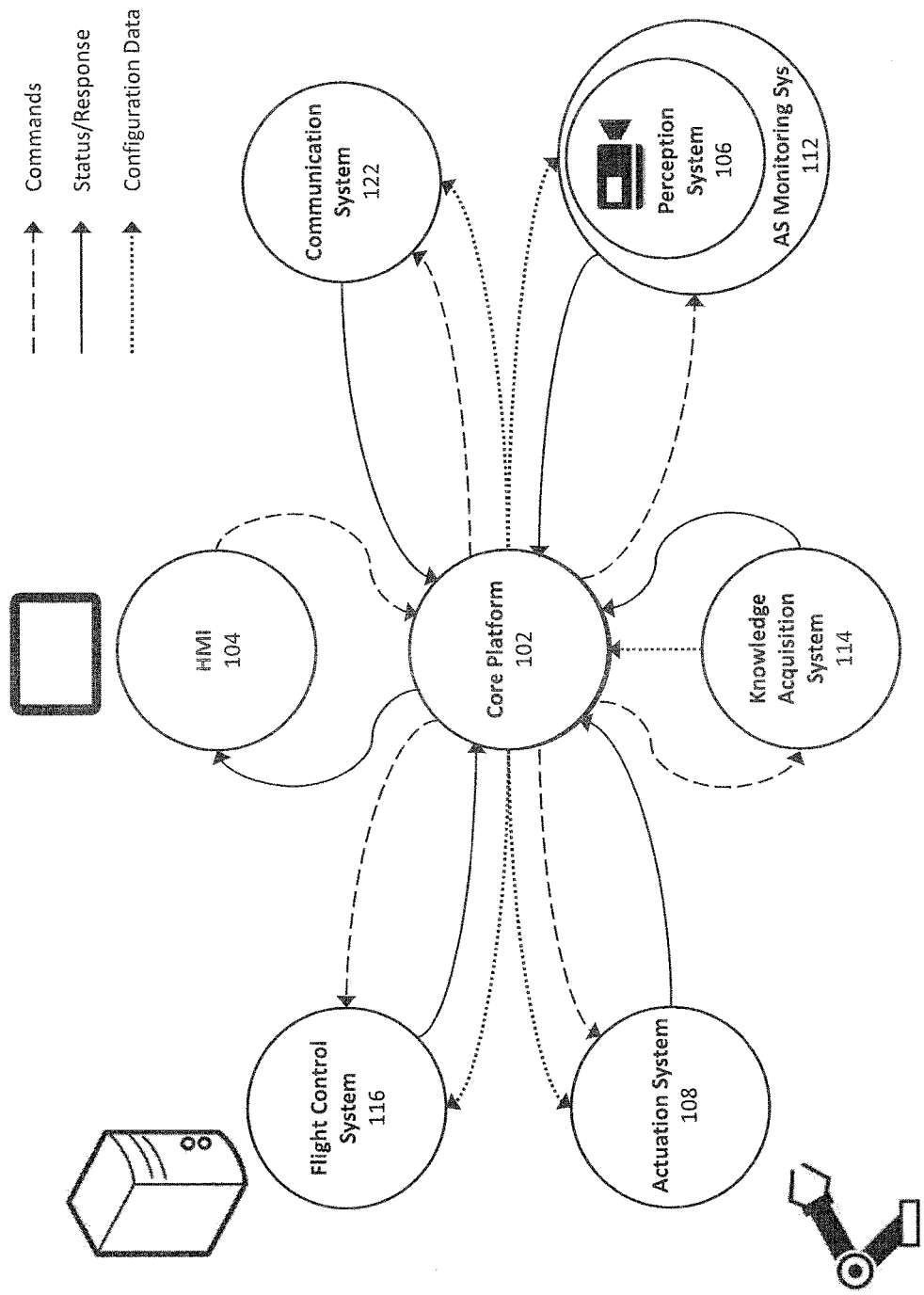
Figure 1C:
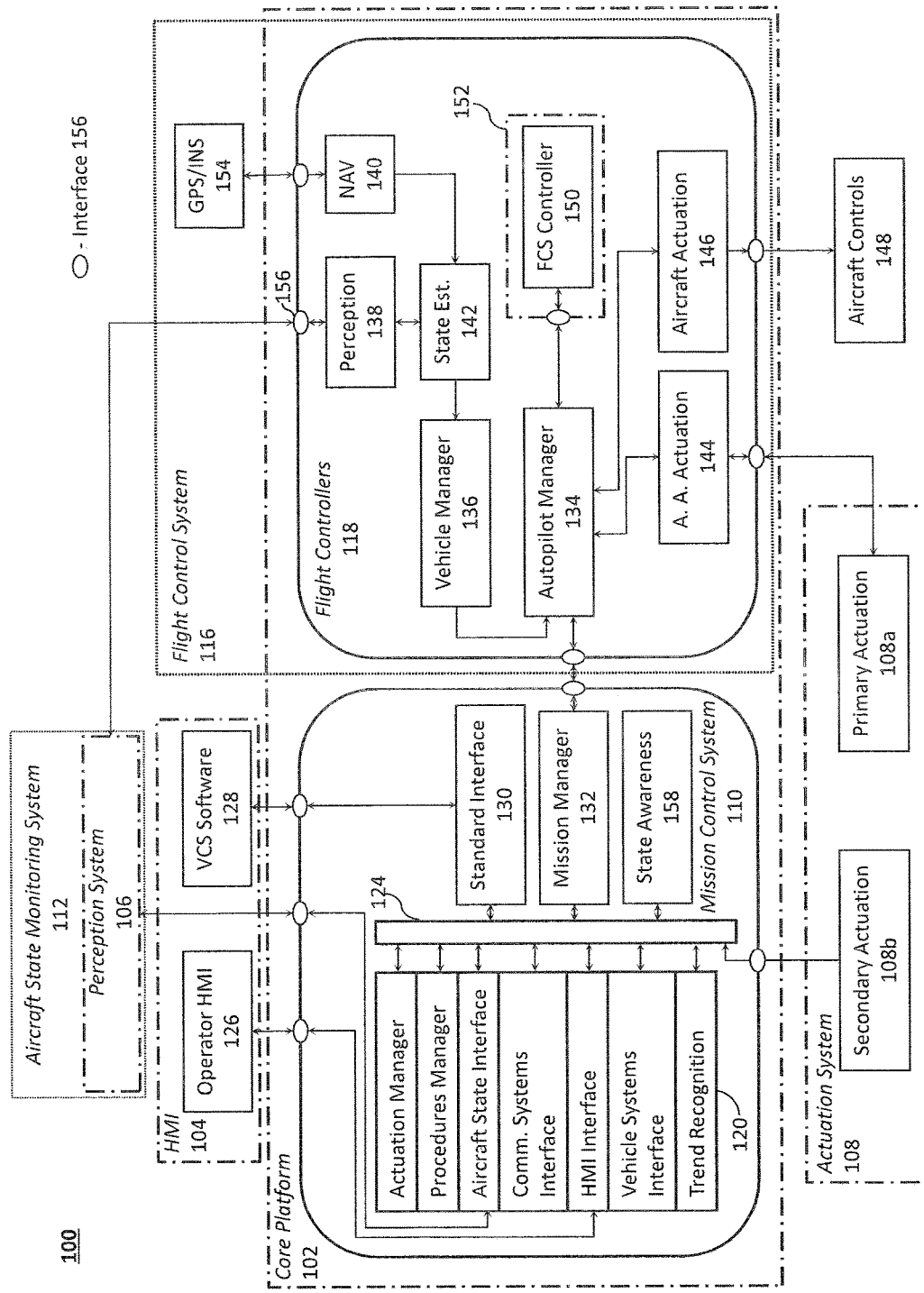
FIG. 1c illustrates a block diagram of an example core platform.

To share the duties and workload related to the execution of flight activities, the aircrew automation system 100 should be capable of executing the actions a pilot would perform routinely over the duration of a flight, regardless of the aircraft make, model, or type. An example system architecture for an aircrew automation system 100 in accordance with one aspect is shown in FIGS. 1*a* through 1*c*. As illustrated in FIG. 1*a*, the core platform 102 may operate as a central subsystem that connects the other subsystems via one or more interfaces. The subsystems may communicate with one another through software and/or hardware interfaces 156 using wired and/or wireless communication protocols and hardware. FIG. 1*b* illustrates an example flow of information (e.g., data) between the various subsystems.

The aircrew automation system 100 may comprise a core platform 102 operatively coupled with a plurality of subsystems, such as those listed below. Each of the plurality of subsystems of the aircrew automation system 100 may be modular, such that the entire aircrew automation system 100 can be substantially ported to another aircraft rapidly. For example, the various subsystems may be removably and communicatively coupled to one another via the core platform 102 using one or more software and/or hardware interfaces 156. In certain aspects, however, the aircrew automation system 100 may alternatively be integral with the aircraft's system, thereby directly employing all sensors and indicators in the airplane. For example, the aircrew automation system 100, or components thereof, may be integrated into the aircraft during its design and manufacturing.

The plurality of subsystems may include, for example, a perception system 106, an actuation system 108, a human machine interface ("HMI") system 104, and a flight control system 116, each of which may be operatively coupled with the core platform 102. In certain aspects, the need for a perception system 106 may be mitigated or obviated via use of another aircraft state monitoring system. For example, the aircrew automation system 100 may couple (e.g., communicatively or electronically) with the instrument panel, or be otherwise integrated with the aircraft or its systems. As can be expected, however, such integration would likely require a degree of modification to the aircraft or its wiring. The aircrew automation system 100 and/or core platform 102 may also comprise, or be operatively coupled to, a knowledge acquisition system 114 and a communication system 122. The modular configuration further enables the operator to remove/disable unnecessary systems or modules or to add/install additional systems or modules. For example, when the aircrew automation system 100 is configured to only provide information to the pilot via the HMI system 104 (i.e., without the ability to control the aircraft), the actuation system 108 may be removed or disabled to reduce weight, cost, and/or power consumption. Accordingly, depending on the configuration, the aircrew automation system 100 may be configured with fewer or additional modules, components, or systems without departing from the spirit and scope of the disclosure.

In operation, the flight control system 116 derives the aircraft state based on information data from another subsystem (e.g., perception system 106) and directs another subsystem (e.g., the actuation system 108) to operate (e.g., dynamically) in a manner to maintain aircraft stability. For example, the flight control system 116 may receive vehicle mode commands and configuration data from the core platform 102, while sending to the core platform 102 status and command information generated by the flight control system 116. For example, the core platform may be configured to communicate one or more commands to the flight control system 116 of the aircraft based at least in part on the flight situation data, which may be obtained from the aircraft state monitoring system 112, the perception system 106, or a combination thereof.

The flight control system 116 may include, or communicate with, existing flight control devices or systems, such as those used in fixed wing aircraft and rotary wing aircraft. The communication system 122 enables the aircrew automation system 100 to communicate with other devices (including remote or distant devices) via, for example, a network. The communication system 122 may receive communication commands and configuration data from the core platform 102, while sending to the core platform 102 status and response information from the communication system 122.

Core Platform 102.

Figure 2:
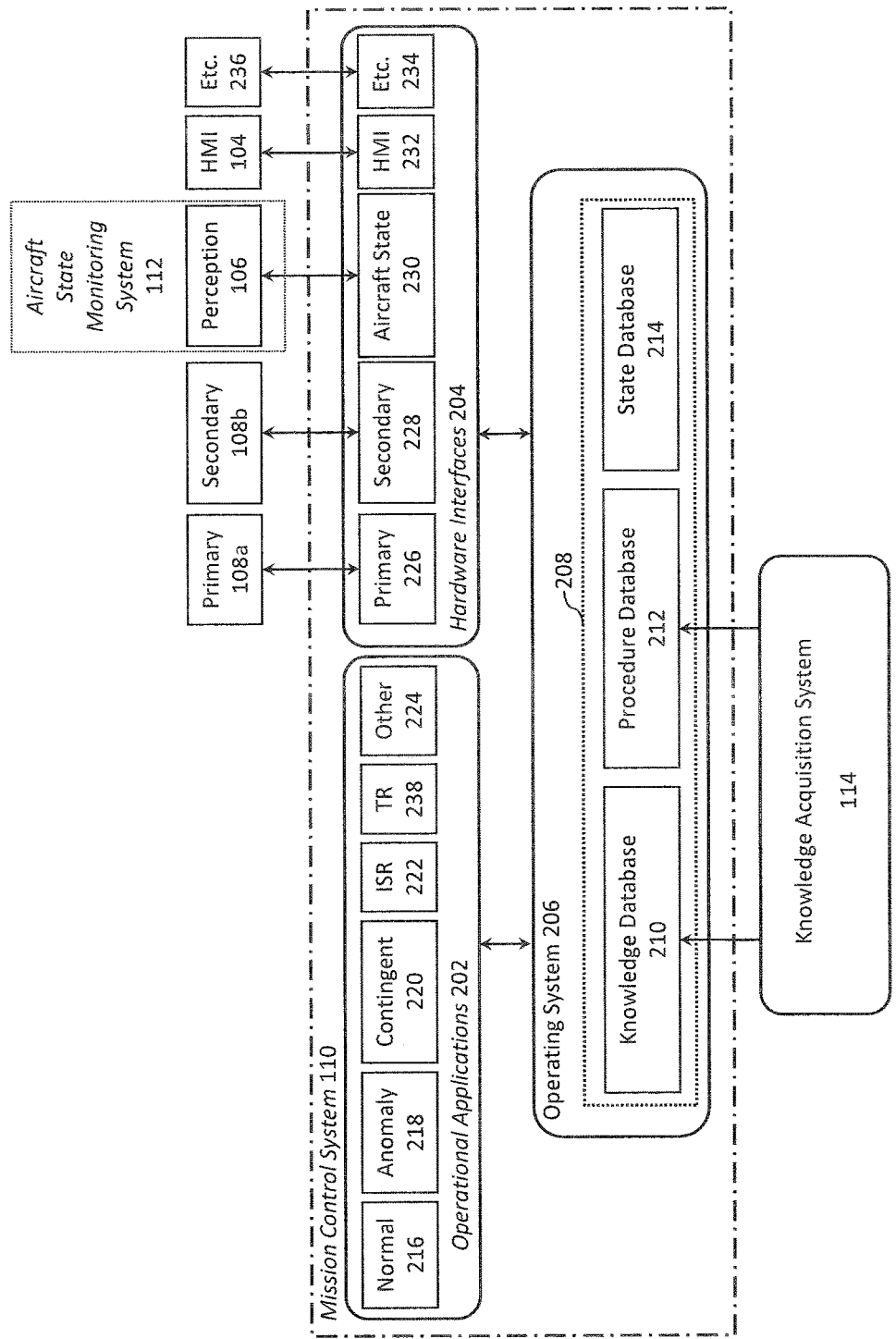
FIG. 2 illustrates a diagram of an example core platform architecture.

FIG. 2 illustrates an architecture diagram of an example core platform 102. To enable a vehicle-agnostic aircrew automation system 100, a core platform 102 may provide, or otherwise serve as, middleware that can be made specific to a particular aircraft or configuration through an initial transition and setup phase. In other words, the mission control system 110 may provide an operating system 206 that provides services to a set of operational applications 202 and output signals to one or more of a set of hardware interfaces 204 or HMI system 104, while collecting and logging the data necessary to enable those applications.

The core platform 102 may serve as the primary autonomous agent and decision-maker, which synthesizes inputs from the perception system 106 and HMI system 104 with its acquired knowledge base to determine the overall system state. The core platform 102 may process inputs from the various sensor suites and aggregate the resultant information into an understanding of current aircraft state. The resultant information may be compared against an aircraft specific file that encompasses aircrew automation system's 100 understanding of pilot intent, system health, and understanding of appropriate aircraft procedures as they relate to the aircrew automation system's 100 state estimation. The resultant state knowledge and associated recommendations can be passed to a human pilot via the HMI system 104 or, in certain aspects, to the flight control system 116 and/or actuation system 108 to enable autonomous operation. The aircrew automation system 100 may further generate a log of a given flight for later analysis, which may be used to facilitate pilot training that can provide detailed training and operations flight debriefs. The logs may be used in connection with, for example, flight operational quality assurance analysis, maintenance analysis, etc.

As illustrated, the core platform 102 may comprise a mission control system 110 and flight controllers 118, each of which are configured to communicate with one another and the other subsystems via one or more software and/or hardware interfaces 156, which may be a combination of hardware (e.g., permanent or removable connectors) and software. The core platform 102 can host various software processes that track the aircraft and procedure states, as well as any modules for trend analytics (predictive warnings) and machine learning routines. In certain aspects, the aircrew automation system 100 and/or core platform 102 may employ a computer bus and specification (e.g., as an interface) that facilitates discovery of a hardware component of a subsystem within the aircrew automation system 100 without the need for physical device configuration or user intervention in resolving resource conflicts. Such a configuration may be referred to as "plug and play." Thus, a user may readily add or remove system or subsystems (e.g., as modules) to the aircrew automation system 100 via the core platform 102 without requiring substantive modification or integration efforts.

The core platform 102 outputs may be used to provide messages to the HMI system 104. The messages may indicate, for example, checklist progress, contingencies to initiate, warnings to raise, etc. The core platform 102 may also contain a flight data recorder, for instance to provide performance review capability and to provide robustness against in-flight reset. The hardware and various computers may also be ruggedized and share a housing with other devices, such as the perception computer. As discussed below, the core platform 102 may be operatively coupled with a global positioning system ("GPS")/inertial navigation system ("INS") system 154 and power management system (e.g., 28 VDC power). The core platform 102 may also contain a flight data recorder, for instance to provide performance review capability and to provide robustness against in-flight reset.

The mission control system 110 generally comprises a mission manager 132, a standard interface 130 (e.g., a STANAG interface), a state awareness manager 158, and other operational components 120 (e.g., hardware and software controllers and/or interfaces), each of which are communicatively coupled to one another via one or more data buses 124. The open architecture of the core platform 102 enables the incorporation of additional data received from systems via the data bus 124. In certain aspects, the mission control system 110 may be coupled with one or more cockpit instruments of the aircraft via the vehicle systems interface to collect flight situation data. In other aspects, the mission control system 110 may collect flight situation data through an aircraft state interface via the aircraft state monitoring system 112, which may collect or generate flight situation data via a direct connection to the aircraft and/or the perception system 106.

As illustrated, the mission control system 110 may be operationally coupled with the secondary actuation system 108*b* (e.g., when autonomous operation is desired), the perception system 106, and the HMI system 104, including the human-machine interface 126 (e.g., software and/or hardware that conveys inputs from and displays information to the pilot), and ground station 128. The mission control system 110 may communicate with the flight controllers 118 via the mission manager 132.

The flight controllers 118 may include, for example, an autopilot manager 134 and a vehicle manager 136. The vehicle manager 136 may be generally responsible for navigation and determining the location and state of the aircraft. The vehicle manager 136 may be coupled with a state estimation module 142, which determines the estimated state of the aircraft using information received from the perception system 106 via a perception module 138 and from the GPS/INS system 154 via a navigation module 140.

The autopilot manager 134 may be generally responsible for controlling the aircraft's flight based on, for example, information received from the vehicle manager 136 and the mission control system 110. The autopilot manager 134 controls, inter alia, the flight control system 152, which may be new or preexisting (and comprises a flight controller 150), as well as the aircrew automation actuation module 144 and the aircraft actuation module 146. The aircrew automation actuation module 144 may control the primary actuation system 108*a*, while the aircraft actuation module 146 may control the aircraft controls 148 (e.g., various flight surfaces and actuators).

In certain aspects, the flight controller's 118 components may overlap with certain components of the flight control system 116. For example, in certain aspects (e.g., where redundancy is not desired and non-invasive integration is possible), the core platform 102 may exploit certain of the existing aircraft software and/or hardware, thereby obviating the need for additional hardware, such as certain flight controller 118 components and/or a GPS/INS system 154.

Open Architecture.

The core platform 102 serves as the central subsystem, or interface, of the aircrew automation system 100, connecting and controlling the remaining subsystems (e.g., as individual applications) in an open architecture. The remaining subsystems include, for instance, the flight control system 116 (including any flight plan capabilities), the HMI system 104, the actuation systems 108 (e.g., the primary and secondary actuation systems to provide autonomous operation where desired), the perception system 106, knowledge acquisition system 114, and other subsystems 236. Thus, control of the other aircrew automation system 100 hardware may be provided via separate applications specific to a particular piece of hardware, which enables rapid integration of new systems or other external flight plan support technology.

The core platform's 102 architecture enables rapid portability and extensibility when transitioning to a new aircraft or incorporating a new flight plan feature/capability. Thus, an application may be used to enable the aircrew automation system 100 to acquire information specific, or otherwise needed, for that aircraft or to provide the new capability. For example, transition and setup can be handled by individual applications that operate within the core platform 102 or other subsystems, representing aircraft-specific functionalities as well as a growing library of capabilities of aircrew automation system 100, which can be exchanged depending on flight plan, aircraft or crew requirements. In certain aspects, the transition process may be supported by software applications external to the aircrew automation system 100 (such as a procedure editor).

Aircraft Data Structure 208.

The operating system 206 operates as the middleware, interconnecting the operational applications 202, hardware interfaces 204, and other subsystems, such as the knowledge acquisition system 114. The operating system 206 may employ an aircraft data structure 208, which may include a knowledge database 210, a procedure database 212, and a state database 214.

The aircraft data structure 208 facilitates a vehicle-agnostic aircrew automation system 100 by enabling the core platform 102 to develop a complete understanding of an aircraft's systems, their configuration, and the procedures necessary to maintain safe operation, and all other knowledge and expertise a certified pilot of that aircraft would be expected to have. The aircraft data structure 208 may be populated by the knowledge acquisition system 114 (discussed below), which contains necessary information about the aircraft currently being operated (e.g., flight control model, operational procedures, aircraft systems, etc.), data received from internal state sensors, and other subsystems or sensors.

The aircraft data structure 208 can be populated and adjusted to a specific aircraft during a knowledge acquisition phase (e.g., during initial setup) such that it contains all the information necessary to operate the aircraft. For example, when transitioning to a new aircraft, the knowledge acquisition system 114 may perform predefined activities in order to determine the layout (e.g., of the controllers/read outs, such as the cockpit instruments), performance parameters, and other characteristics of the aircraft. The predefined activities may include, for example: (1) generation of an aircraft system model, which informs aircrew automation system 100 about which systems are onboard and how they are configured, actuation limits, etc.; (2) procedure codification, which informs aircrew automation system 100 how to operate aircraft in normal and non-normal situations, further including the codification of checklists; (3) an aerodynamic model, which informs the aircrew automation system 100 how to fly the aircraft and what performance to expect for which aircraft configurations; and (4) information about mission operations.

The core platform 102 can combine this information with data from a set of internal state sensors, which also improve redundancy and system robustness, thereby allowing the aircrew automation system 100 to generate a highly accurate estimate of the aircraft state and system statuses, and to identify deviation from expected behavior. During flight operations, the data structure is dynamically updated with real-time data gathered by, inter alia, the aircrew automation system's 100, perception system 106, the HMI system 104, as well as the aircrew automation systems 100 internal state sensing. Once the aircraft data structure 208 for a given aircraft is populated, the aircraft data structure 208 can then be retained in an aircraft library and used for all other aircraft of the same make and model for which aircrew automation system 100 is available. The aircraft data structure 208 may be further refined as additional data is generated and/or collected by the aircrew automation system 100.

Operational Applications 202.

The core platform 102 may provide the aircrew automation system 100 with a plurality of operational applications 202. Examples of such operational applications 202 might include, without limitation, normal flight operation application 216, an anomaly detection application 218, a contingency operation application 220, an intelligence, surveillance, and reconnaissance ("ISR") application 222 (e.g., ISR orbits), a trend recognition application 238, or other flight plan-specific activity applications 224, such as an aerial refueling application 316.

The normal flight operation application 216 enables aircrew automation system 100 to fly a predetermined flight plan from takeoff to landing, assuming no contingencies. The normal flight operation application 216 is specific to the continuous execution of normal flight activity, as needed by a particular flight phase. The predetermined flight plan may be modified in flight due to unexpected disturbances such as weather, air traffic control commands, air traffic, etc.

The anomaly detection application 218 employs machine learning techniques to monitor aircraft state, cluster, and classify sensor inputs in order to detect the presence of non-normal situations, and to identify whether a contingency has occurred. The anomaly detection application 218 is configured to compare the sensed states against a set of thresholds defined in the operational documentation for the specific aircraft (e.g., never exceed a predetermined airspeed, engine temperature, etc.). The anomaly detection application 218 may also compare the sensed states against additional information available to aircrew automation system 100 and generate alerts or other messages in response to meeting predetermined or dynamically determined thresholds (e.g., warning thresholds, etc.).

In case of a contingency condition, a contingency operation application 220 executes the necessary predetermined checklists, procedures, and actions specified by the contingency application 220 in order to maintain safe operation of the aircraft or safely divert the flight. Notably, if a departure from expected performance is observed, the pilot can be alerted to a non-normal condition, thereby mitigating or avoiding potential mistakes. If an aircraft is susceptible to a particular operational error (e.g., pilot induced oscillations), the aircrew automation system 100 can identify and mitigate such events. If an anomaly is detected, the contingency operation application 220 informs and interacts with the pilot via the HMI system 104 and ultimately executes the necessary procedure(s) to respond to the anomaly. Finally, the ISR application 222 and other flight plan-specific activity applications 224 may provide instructions, algorithms, or information to carry out operations relevant to a mission.

The trend recognition application 238 provides trend analysis developed using machine learning based on, for example, the knowledge acquisition system 114. In certain aspects, the trend recognition application 238 may supply data, or otherwise trigger, the anomaly detection application 218. For example, if the trend recognition application 238 detects an undesirable trend, the trend may be flagged as an anomaly and reported to the anomaly detection application 218.

Hardware Interfaces 204.

The various information pertaining to the operational applications 202 are communicated between the primary actuation system 108a, secondary actuation system 108b, perception system 106, aircraft state monitoring system 112, HMI system 104, and other subsystems 236 via, for example, the primary actuation interface 226, secondary actuation interface 228, aircraft state interface 230, HMI interface 232, and other interface 234.

Human/Machine Interface (HMI) System 104.

The HMI system 104 provides a control and communication interface for the pilot (e.g., a human pilot, whether on-board or remote). The HMI system 104 is configurable to operate as a flight plan manager that enables the pilot to direct the aircrew automation system 100. The HMI system 104 can combine elements of glass cockpits, unmanned aerial vehicle ("UAV") ground stations, and electronic flight bags (EFB) to enable effective, efficient and latency-tolerant communication between the pilot and aircrew automation system 100. Generally speaking, an EFB is an electronic information management device that allows flight crews to perform a variety of functions that were traditionally accomplished by using paper references. The HMI system 104 may include a human-machine interface 126, which may be based on a touch screen graphical user interface ("GUI") and/or speech-recognition systems. The human-machine interface 126 may employ, for example, a tablet computer, a laptop computer, a smart phone, or combination thereof. The human-machine interface 126 can be secured near the pilot (e.g., on the yoke—as checklists often are, or on a knee-strap) depending on pilot preferences. The human-machine interface 126 may be removable coupled to the cockpit or, in certain aspect, employ an integrated display within the cockpit (e.g., an existing display).

Figure 3A:
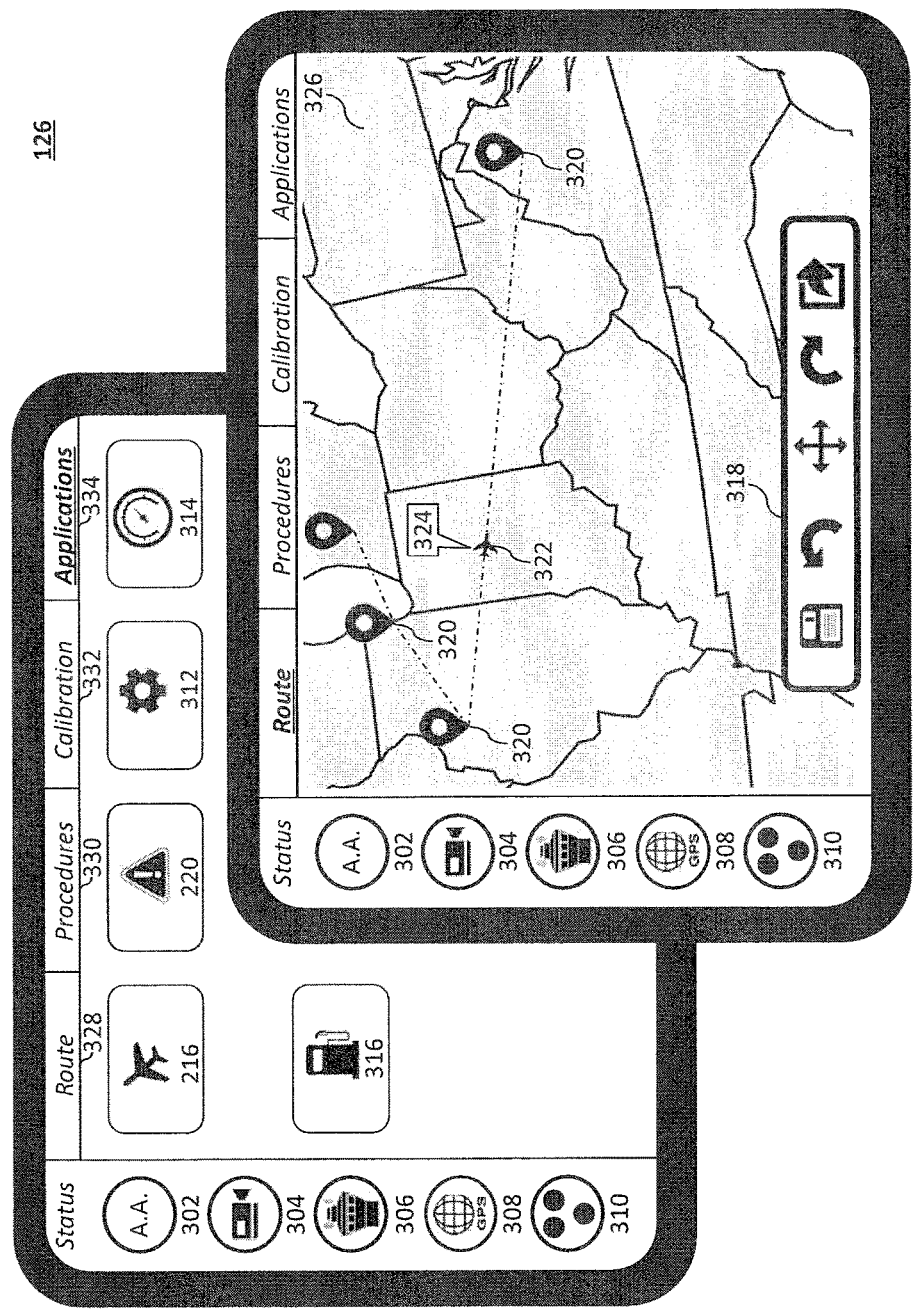
FIG. 3a illustrates a first example human-machine interface illustrating a route application.

FIG. 3a illustrates an example human-machine interface 126 having a single-screen touch interface and speech-recognition system. The HMI system 104 serves as a primary channel of communication between the pilot and the aircrew automation system 100, enabling the pilot to command tasks to and receive feedback or instructions from the aircrew automation system 100, to change the allocation of tasks between pilot and aircrew automation system 100, and to select which operational applications 202 are currently enabled for the aircrew automation system 100.

As illustrated in FIG. 1b, for example, the HMI system 104 may receive status information from a subsystem via the core platform 102, while sending to the core platform 102 mode commands generated by the HMI system 104 or input by the pilot. The pilot may be remote (e.g., on the ground or in another aircraft) or on-board (i.e., in the aircraft). Thus, in certain aspects, the HMI system 104 may be remotely facilitated over a network via communication system 122.

Human-Machine Interface 126.

Figure 3B:
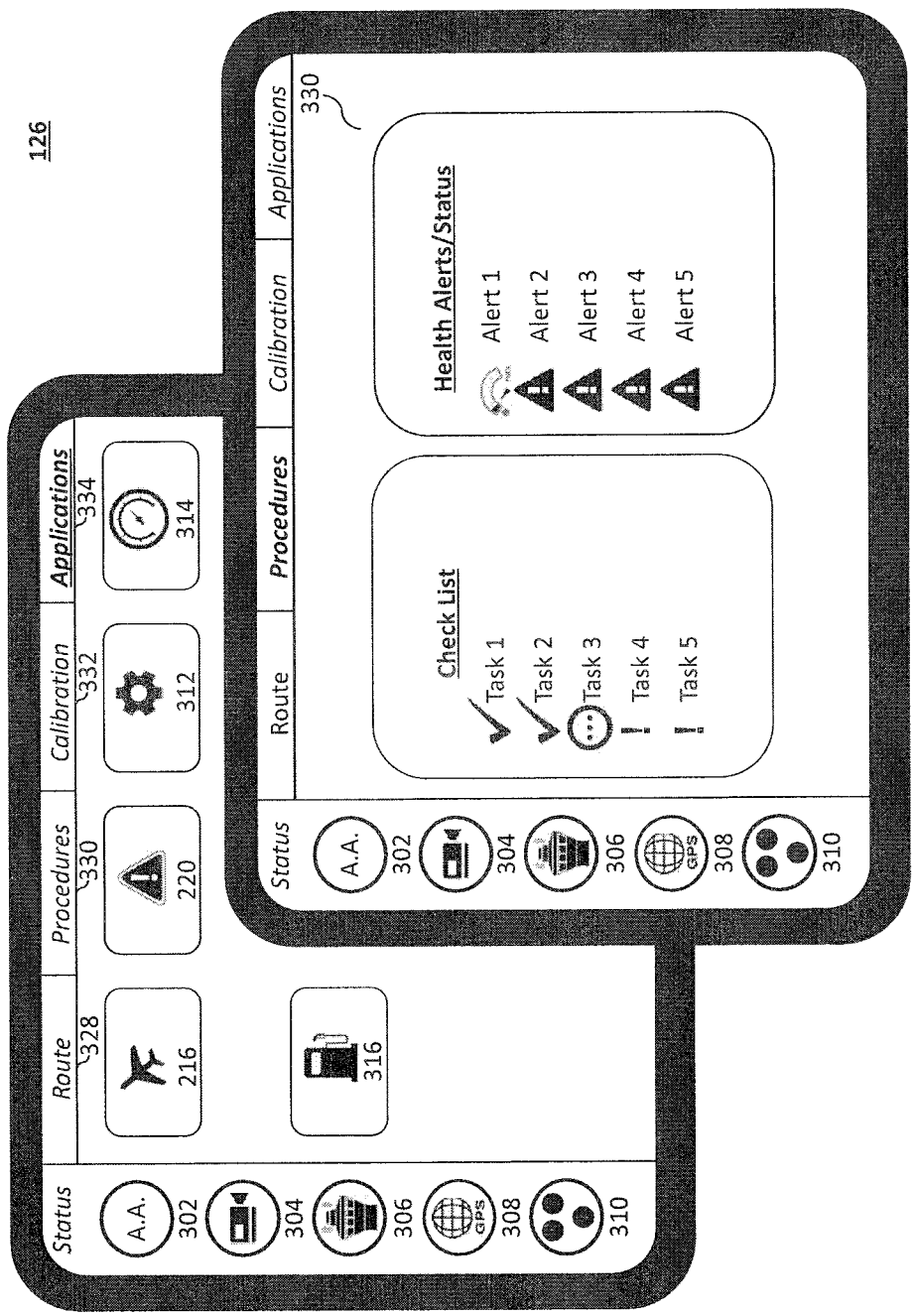
FIG. 3b illustrates a second example human-machine interface illustrating a procedural checklist and aircraft health alert screen.

As illustrated in FIGS. 3a and 3b, the human-machine interface 126 may employ a tablet based GUI and a speech-recognition interface that enables vocal communications. An objective of the human-machine interface 126 is to enable the pilot to interact with the core platform 102's knowledge base in manner akin to the way a pilot interacts with a human flight engineer or copilot.

The human-machine interface 126 can display the current state of aircrew automation system 100 (its current settings and responsibilities) as well as which operational applications 202 are currently installed, which operational applications are running and, if they are active, which actions the operational applications 202 are taking. The human-machine interface 126's GUI display may also be night-vision goggles compatible such that it is visible regardless of the pilot's eyewear. The speech-recognition system may be used to replicate the same types of verbal communications used by human flight crew when running through checklists and communicating on the flight deck. In certain aspects, the speech recognition may be limited to the same standards of codified communications used by pilot teams to minimize the chances of the system failing to recognize commands or changing into inappropriate modes of operations. The speech-recognition system may be configured to learn/recognize the speech of a given pilot through a voice training protocol. For example, the pilot may speak a predetermined script such that the speech-recognition system can become trained with the pilot's dialect.

The human-machine interface 126 may provide the status and/or details of various operations, including the entire aircrew automation system 100 via the aircrew automation status application 302, the perception system 106 via the perception status application 304, the autopilot via the autopilot status application 306 (where applicable), the GPS/INS system 154 via the GPS status application 308, and any other application or system status information 310. The display of the human-machine interface 126 may be customized by the pilot. For example, the pilot may wish to add, reorganize, or remove certain of the display icons and/or operational applications 202, which may be accomplished through a select and drag maneuver or through the aircrew automation settings application 312. The human-machine interface 126 may further inform the pilot regarding the aircraft's operating status and to provide the pilot with instructions or advice.

As illustrated, the human-machine interface 126 may provide a tool bar with various selectable tabs, such as a route tab 328, a procedures tab 330, a calibration tab 332, and an applications tab 334. When the pilot selects the applications tab 334, for example, the human-machine interface 126 may display the various operational applications 202 installed on the aircrew automation system 100 (e.g., the core platform 102), including, for example, a normal flight operation application 216, a contingency operation application 220, an aircrew automation settings application 312, gauge application 314, and aerial refueling application 316.

Selecting the aircrew automation settings application 312 enables the pilot to change, reallocate, or otherwise edit the settings of the aircrew automation system 100 and/or to install operational applications 202. Selecting the gauge application 314 may cause the human-machine interface 126 to display the various operational conditions of the aircraft, including, for example, position, direction, speed, altitude, pitch, yaw, etc. The various operational conditions of the aircraft, which may be gathered from the perception system 106 or another sensor, may be displayed as alphanumeric characters or as graphical dials (e.g., in accordance with the pilot's preference settings). Finally, selecting the aerial refueling application 316 icon may cause the aircrew automation system 100 to perform a predetermined protocol for facilitating or coordinating a mid-air refueling operation. For example, upon selecting the aerial refueling application 316, the aircrew automation system may coordinate with another aircraft to facilitate refueling and perform the necessary checklists for doing the same (e.g., ensuring aircraft position, airspeed, fuel hatch opening, etc.). Additional mission applications may be included that enable performance of mission operations by the aircrew automation system.

When the pilot selects the route tab 328, the human-machine interface 126 may display an area map 326 with an icon 322 representing the current location of the aircraft along a flight path relative to its various waypoints 320. Selecting (e.g., tapping, clicking, etc.) the icon 322 may cause a dialog window 324 to display that provides the various operational conditions of the aircraft. The area map 326 may be saved, exported, rotated, or panned using a map control window 318. The area map 326 may be saved or exported (e.g., via communication system 122) as a static image or a data set (or database). When the pilot selects the calibration tab 332, the human-machine interface 126 may display the calibration of the aircraft, whereby the pilot may be further enabled to revise the same.

The HMI system 104 may provide an intuitive display and interface that includes checklist verification and health alerts from the core platform 102 and predictions of aircraft state (e.g., fuel consumption and predicted remaining range), as well as failure prognosis and deviation alerts (e.g., "Left engine EGT is 5 degrees above normal and rising"). Thus, when the pilot selects the procedures tab 330, as illustrated in FIG. 3b, the pilot may review and monitor checklist items, as well as review any health alerts. Indeed, a function of the HMI system 104 is to facilitate checklist monitoring and/or execution, marking items as complete when the when the perception system 106 perceives their completion and providing warnings to the pilot when items are not completed, as based on information previously imported from, for example, a Pilot's Operating Handbook (POH). The aircrew automation system 100 also monitors system health, comparing the current system state to that expected based on the POH and other knowledge sources, and guides appropriate responses to contingencies. In certain aspects, either the pilot or the core platform 102 can acknowledge checklist actions as they are performed and the HMI system 104 automatically proceeds to the correct checklist as appropriate. The HMI system 104 may give visual and auditory alerts to direct the pilot's attention to unattended checklist items, instruments that are displaying out-of-normal range values, or predicted events as the aircraft proceeds through the flight plan, which can be entered as a series of waypoints (for instance). For example, as illustrated, a list of tasks may be provided alongside indicators that indicate whether the task has been completed, is being completed, or needs to be completed (e.g., a "check mark" icon to include complete, an "in progress" icon, and a "to be completed" icon). Similarly, a list of health hazards may be provide, along with one or corresponding icons to indicated one or more operational conditions that are out of range. For example, a low fuel indicator may be provided alongside a low fuel icon if fuel is low.

Task Allocation.

The HMI system 104 can enable the pilot to limit the activities executed by the aircrew automation system 100, if any. The HMI system 104 may define the allocation of tasks between the pilot and aircrew automation system 100, their responsibilities, and the communication of information between the two, thereby functioning as a collaborative teammate of the pilot. Thus, the aircrew automation system 100 may operate, depending on configuration, in a purely advisory role (i.e., without any control over the aircraft), a fully autonomous role (i.e., controlling the flight control without pilot intervention), or an advisory role with the ability to control flight controllers. The HMI system 104 may be further designed to enable a pilot to go through a transitional phase, where the pilot specifies the aspects of flight operation for which the aircrew automation system 100 is responsible. For example, the HMI system 104 may display a list of tasks where the pilot may select whether the aircrew automation system 100 or the pilot is responsible for a given task on the list. The list of tasks may be provided to the HMI system 104 from a procedure editor, which is described below. Once the aircraft data structure 208 has been populated and refined such that the pilot better trusts the aircrew automation system 100, the pilot may allow aircrew automation system 100 to perform additional actions, transitioning the pilot from a primary mode to a supervisory mode (i.e., a fully autonomous role). In this supervisory mode, pilot interactions may be at a high, goal-based level, with the HMI system 104 supporting those tasks as well as allowing the operator insight at other levels for troubleshooting. As noted above, in certain aspects, all tasks may be performed by the pilot, leaving the aircrew automation system 100 to serve an advisory role.

Mode Awareness.

A risk when employing any automation system is the potential for mode confusion on the part of the pilot (e.g., where the pilot neglects a task believing that the automation system will handle the task). The HMI system 104 avoids such mode confusion by first generating the correct function and the above-described task allocation between the aircrew automation system 100 and the pilot. Indeed, the HMI system 104 allows the pilot to directly command and configure aircrew automation system 100 via the human-machine interface 126 and displays the information necessary for the pilot to understand what actions the aircrew automation system 100 is taking to ensure mode awareness. In other words, mode awareness generally refers to a state where the mode of the system matches the operational mode expected by the operator. The human-machine interface 126 may display the information necessary to ensure that the pilot is always aware of the mode in which aircrew automation system 100 is operating. Additionally, the HMI system 104 serves as the human interface for individual mission applications (e.g., operational applications 202).

Aircraft State Monitoring System 112.

The aircraft state monitoring system 112 collects, determines, or otherwise perceives the real-time aircraft state. As noted above, the aircraft state monitoring system 112 may perceive the real-time aircraft state through, inter alia, a direct connection (e.g., integral with or otherwise hardwired to the aircraft) to the aircraft, or via perception system 106. When a perception system 106 is used, the aircraft state monitoring system 112 may include a dedicated controller (e.g., processor) or share the controller 402 of the perception system 106. The perception system 106, for example, may employ a combination of a vision system, an acoustic system, and identification algorithms to read or comprehend flight situation information displayed by cockpit instruments. Example cockpit instruments include, for example, an altimeter, an airspeed indicator, a vertical speed indicator, one or more compass systems (e.g., a magnetic compass), one or more gyroscopic systems (e.g., attitude indicator, heading indicator, turn indicator), one or more flight director systems, one or more navigational systems (e.g., very-high frequency omnidirectional range (VOR), non-directional radio beacon (NDB)), etc. The perception system 106 may include a processor and one or more optical sensors (e.g., three or more lightweight machine vision cameras) trained on the instrument panel to maximize pixel density, glare robustness, and redundancy. The one or more optical sensors may wiredly connect to the perception computer via, for example, Ethernet. The one or more optical sensors should be installed with a line of sight with the instrument panel, but so as to be not obstructive to the pilot.

The flight situation data perceived by the perception system 106 may be encoded and provided to the core platform 102 in real-time. The open architecture of the core platform 102 enables the incorporation of additional data received via a data bus 124 to augment the flight situation data generated by the perception system 106. As illustrated in FIG. 1b, for example, the aircraft state monitoring system 112 and/or the perception system 106 may receive commands and configuration data from the core platform 102, while sending to the core platform 102 status and flight situation information (e.g., flight situation data) gathered by the perception system 106 or otherwise collected by the aircraft state monitoring system 112.

Figure 4:
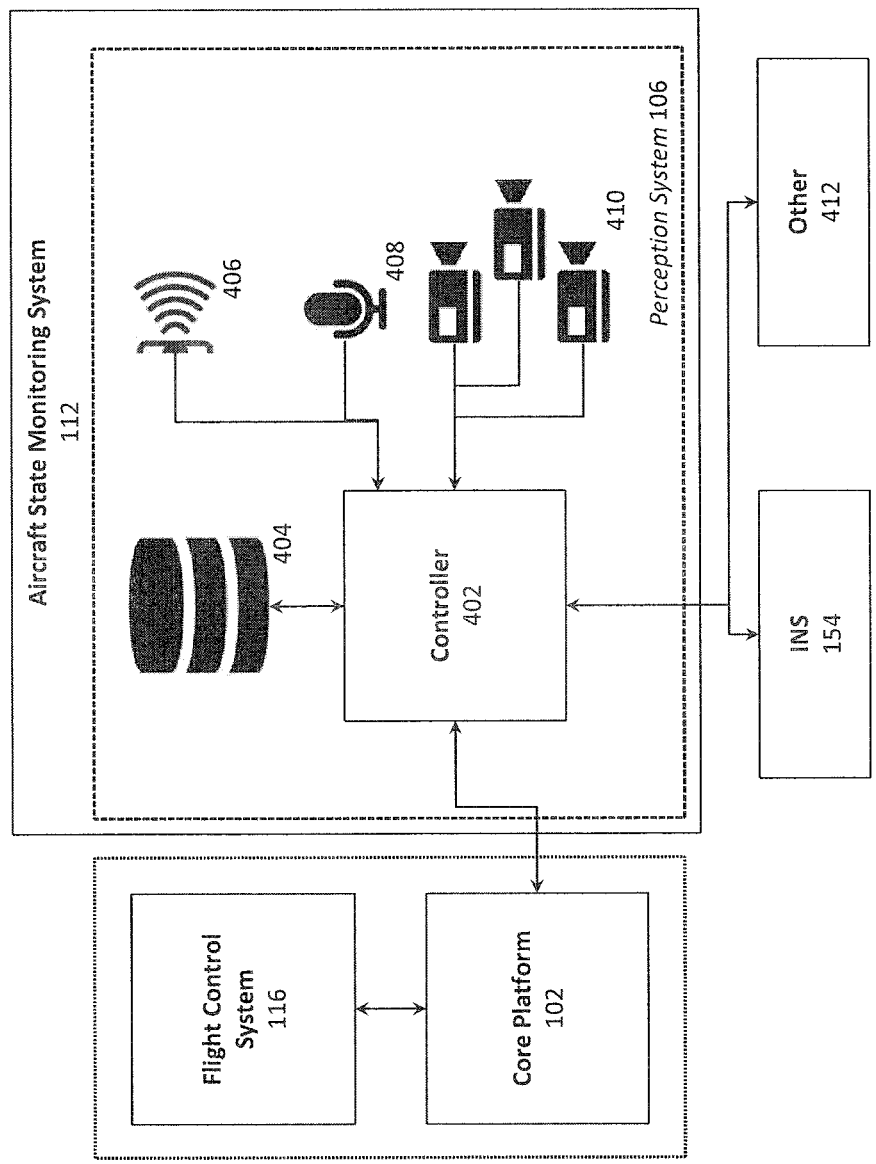
FIG. 4 illustrates a block diagram of an example perception system.

FIG. 4 illustrates an example perception system 106 operatively coupled with, inter alia, the core platform 102 (which is coupled to other subsystems, such as flight control system 116), the GPS/INS system 154, and any other input systems 412. The perception system 106 visually and/or acoustically monitors, inter alia, the cockpit instruments to generate flight situation data that can be used to derive the aircraft state from cockpit layouts, which may range from basic analog aircraft instruments to highly integrated, glass cockpit avionics suites. In addition to deriving physical state such as airspeed and altitude, the perception system 106 may also monitor instruments that are specific to aircraft systems such as fuel gauges and radios and provide secondary feedback about the status and positioning of the actuation system 108.

As illustrated, the perception system 106 may comprise a perception controller 402 that is operatively coupled with a database 404 and a plurality of sensors, such as cameras 410 (used for the vision system), microphone 408 (used for the acoustic system), and/or other sensors 406 (e.g., temperature sensors, positional sensors, inertial sensors, etc.). The perception controller 402 may be, for example, a processor configured to feed flight situation data to (or otherwise instruct) the core platform 102 based upon information received and manipulated information received from the plurality of sensors, the database 404, and external components, such as the GPS/INS system 154 and other input systems 412.

Vision System.

The perception system 106 may employ a monocular or stereovision system, possibly including motion capture markers, to continuously monitor the state of the aircraft by reading what is displayed on the cockpit instruments. In certain aspects, by comparing information about a scene from two vantage points, 3D information can be extracted by examining the relative positions of objects in the two panels. The vision system may be used to accurately monitor instruments (e.g., glass gauges, physical steam gauges, etc.) and switches, as well as their positions in a variety of lighting conditions and cockpit layouts and sizes. Using a stereovision system and/or markers also provides sensing to prevent collisions between any robotic components and the pilot.

The vision system may employ a suite of high-definition, stereo cameras and/or a LIDAR laser scanner. The system may be capable of recognizing data from all flight instruments and derive the state of switches knobs and gauges that display the state of aircraft specific systems (e.g., remaining fuel). It may also be capable of recognizing the state of the panel with enough resolution to detect minor changes that result from pilot actions. Machine vision algorithms on the perception system 106 computer 'read' the instruments (gauges, lights, wind correction angle panel, individual elements of the primary flight display or multi-function display in a glass cockpit) and mechanical items such as throttle levers, trim settings, switches, and breakers to provide a real-time cockpit state update to the core platform 102.

The perception system 106 may be capable of deriving the aircraft state from cockpit layouts ranging from basic analog aircraft instruments to highly integrated, "glass cockpit" avionics suites. Through the vision system, the requirement for a data feed from the aircraft is obviated, which permits/ increases portability across aircraft. However, when possible, the aircrew automation system 100 may also be coupled to an aircraft's data feed (e.g., through a data port). Further, using the application approach described for the core platform 102, different cockpit layouts can be addressed and understood using different underlying operation applications 202. For example, the aircrew automation system 100 may employ the gauge application 314 to derive the values displayed on the instruments, whether graphical dial (e.g., analog "steam" gauges or digital representations thereof) or a glass cockpit. This approach would also enable the aircrew automation system 100 to run operational applications that monitor, inter alia, weather radars, traffic displays, and terrain maps displayed in the cockpit.

In order to make aircrew automation system 100 portable, the process of rapidly learning a new cockpit layout and codifying subtle differences in location and scaling or unit of instruments is addressed by the perception system 106 design. For example, during the initial knowledge acquisition phase, the location and scale of instruments and switches can be encoded and verified for a particular aircraft, reducing the real-time task to the extraction of the position of the graphical dial (round dial) or number (glass cockpit), whether graphical dial gauges, CRT display, LCD, etc. The piece-wise planar structure of cockpit instrumentation enables the perception system 106 to construe the images (e.g., using Homography methods) and register it against the pre-mapped data generated during the initial knowledge acquisition phase. Accordingly, live imagery can be registered and compared against the previously annotated model, thereby greatly simplifying interpretation of the data.

Actuation System 108.

When desired, an actuation system 108 executes the actions commanded via the core platform 102 to guide the flight and overall operation of the aircraft. The aircrew automation system's 100 actuation system 108 executes the actions commanded by the core platform 102 to guide the flight and overall operation of the aircraft without interfering with the activities performed by the pilot. As illustrated in FIG. 1b, for example, the actuation system 108 may receive actuation commands and configuration data from the core platform 102, while sending to the core platform 102 status and response information generated by the actuation system 108.

Manned aircraft cockpits are designed for the human reach envelope and, therefore, all cockpit controls are reachable by a comparably sized robotic/mechanical manipulator. A manipulator capable of actuating every single switch, knob, lever and button on every single possible cockpit in high-G and vibration environments with the rapid execution required for emergency operation, however, would be expensive, heavy, and more invasive than what is desired for the aircrew automation system 100.

To more effectively achieve portability across aircraft, the aircrew automation system 100 may separate the actuation of primary flight controls (stick/yoke, stick, side-stick or collective, rudder pedals, brakes, and throttles) from the actuation of secondary flight controls (e.g., switches, knobs, rockers, fuses, etc.). This approach reduces the likelihood of designing a single point solution that becomes obsolete as aircraft evolve. Thus, the aircrew automation system 100 may employ a primary actuation system 108a and a secondary actuation system 108b to physically control the actuators in the cockpit. More specifically, the primary actuation system 108a may actuate the primary flight controls, while the secondary actuation system 108b may actuate the secondary flight controls, without obscuring the use of those controls by the pilot. The primary actuation system 108a and the secondary actuation system 108b are configured to collectively actuate all standard controls present on today's flight decks during flight operations.

As discussed below, the primary actuation system 108a focuses on actuating the primary flight controls (stick/yoke, stick, side-stick or collective, rudder pedals, brakes, and throttles), while the secondary actuation system 108b focuses on actuating the controls that are not as easily accessed by the primary actuation system 108a, such as secondary flight controls (e.g., switches, knobs, rockers, fuses, etc.).

Primary Actuation System 108a.

Figure 5B:
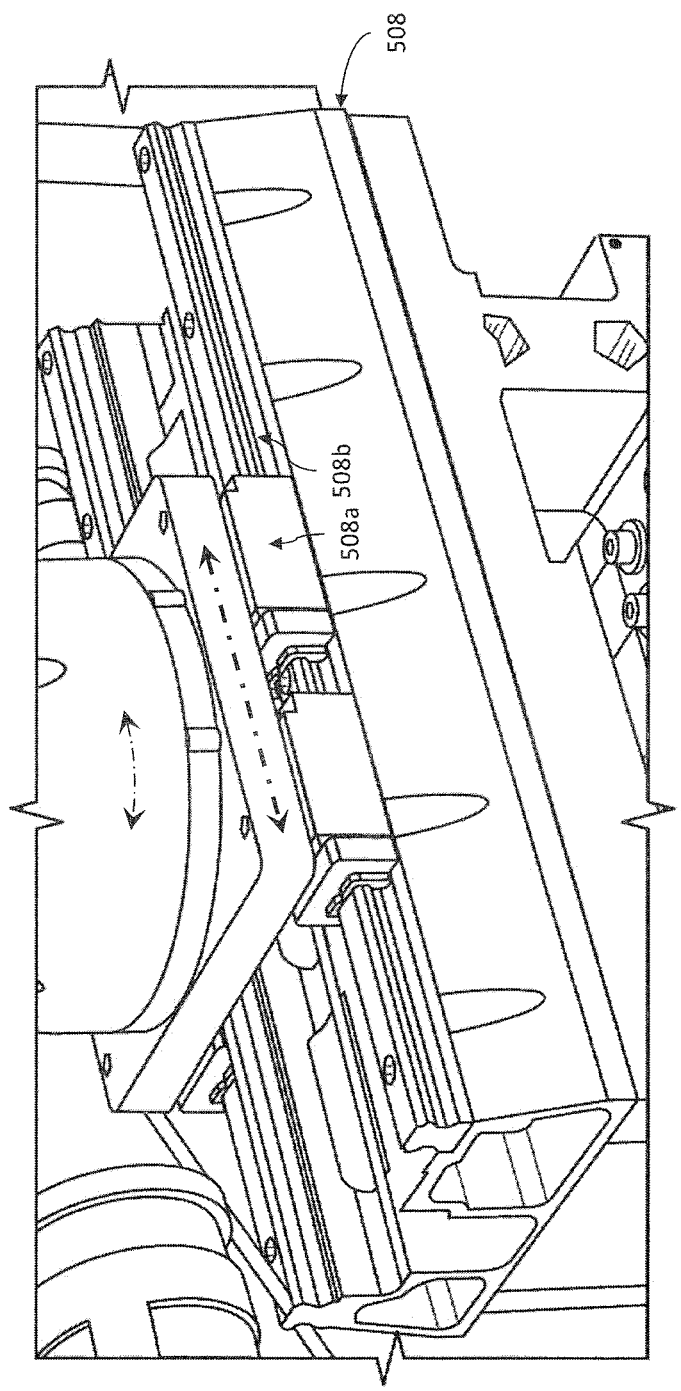

The primary actuation system 108a focuses on the set of controls necessary to safely operate the aircraft. As shown in FIGS. 5a and 5b, primary actuation system 108a include a frame 516 having an articulating arm 502 (e.g., a robotic appendage or "arm") and stick/yoke actuator 510 that actuates the primary flight controls (yoke, stick, side-stick or collective, rudder pedals, brakes, and throttles) and other, easy to reach controls. The actuators may be one or more of linear (straight line), rotary (circular), or oscillatory actuators, which may be driven through one or more of electrical, pneumatic, and/or hydraulic techniques.

The frame 516 may be sized and shaped to fit within the seat of a standard aircraft. To that end, the frame's 516 footprint should be about the same size as, or smaller than, an average human's "seated" footprint. The actuation system 108 may be fabricated using lightweight metals, metal alloys, and/or composite materials.

Stick/Yoke Actuator 510.

The stick/yoke actuator 510 may couple to and engage the aircraft's existing stick/yoke 514 using a stick/yoke gripper 512. The stick/yoke gripper 512 may be sized and shaped such that it is universal and can engage various forms of stick/yokes and/or control wheels. The stick/yoke actuator 510 may be configured to move the stick/yoke 514 forward, backward, left, right, and positions therebetween. The stick/yoke gripper 512 may further comprise one or more actuators for actuating buttons and/or switches positioned on the stick/yoke 514.

Articulating Arm 502.

The actuator-controlled articulating arm 502 may be sized, shaped, and configured to occupy the space typically occupied by a co-pilot's arms, thereby ensuring portability across aircraft. To enable movement in multiple degrees of freedom ("DOF") movement, the articulating arm 502 may comprise a plurality of arm segments (whether linear, curved, or angled) joined using a plurality of hinged or pivotal joints 506. The articulating arm 502 may comprise a gripper 504 at its distal end. The gripper 504 may be coupled to the articulating arm 502 via a multiple-DOF connection. The base of the articulating arm 502 may be rotatable and slideably coupled to the frame 516 via a movable base 508. For example, the articulating arm 502 may be coupled with an upper base 508a, which is slideably coupled with a lower base 508b, which may be secured to the frame 516. The upper base 508a may slide relative to the lower base 508b using, for example, a combination of rails and ball bearings. In certain aspects, the upper base 508a may slide relative to the lower base 508b along both the X- and Y-axis.

The articulating arm 502 can be equipped with an encoder (e.g., twin 18-bit encoders) for each of its degrees of freedom to ensure exact positioning of the articulating arm 502. Internal clutches may be provided at each hinged or pivotal joint 506 such that the articulating arm 502 can be overpowered by the pilot if so desired, without damaging the articulating arm 502. In such a case, the aircrew automation system 100 may determine the position or location of the articulating arm 502 using the encoders.

The gripper 504 may be configured to couple, or otherwise engage, for example, throttle levers, etc. The gripper 504 may also provide force and pressure detection so as to allow the aircrew automation system 100 to estimate how a flight controls actuator is grasped and to adjust the motion to properly throw it. Once the motion is executed, the same feedback may be used to determine if the desired switch configuration has been achieved. In certain aspects, the articulating arm 502 may be fitted with an electronic device (e.g., a homing device) that enables it to find and hit a target.

Secondary Actuation System 108b.

Unlike the primary flight controls, which are generally located in the same vicinity across aircraft makes and types, the location of the secondary flight controls (e.g., avionics, switches, knobs, rockers, toggles, covered switches, fuses, etc.) is not as consistent or spatially contained from aircraft to aircraft.

The secondary actuation system 108b focuses on actuating the controls that are not as easily accessed by the primary actuation system 108a. For example, some switches may even be on an overhead panel directly above the captain's head, making it potentially difficult to manipulate them with a robotic arm (especially in turbulent flight conditions). Accordingly, some actuators may be allocated to the above described primary actuation system 108a, while others may be allocated to a self-contained, secondary actuation system 108b.

Figure 5C:
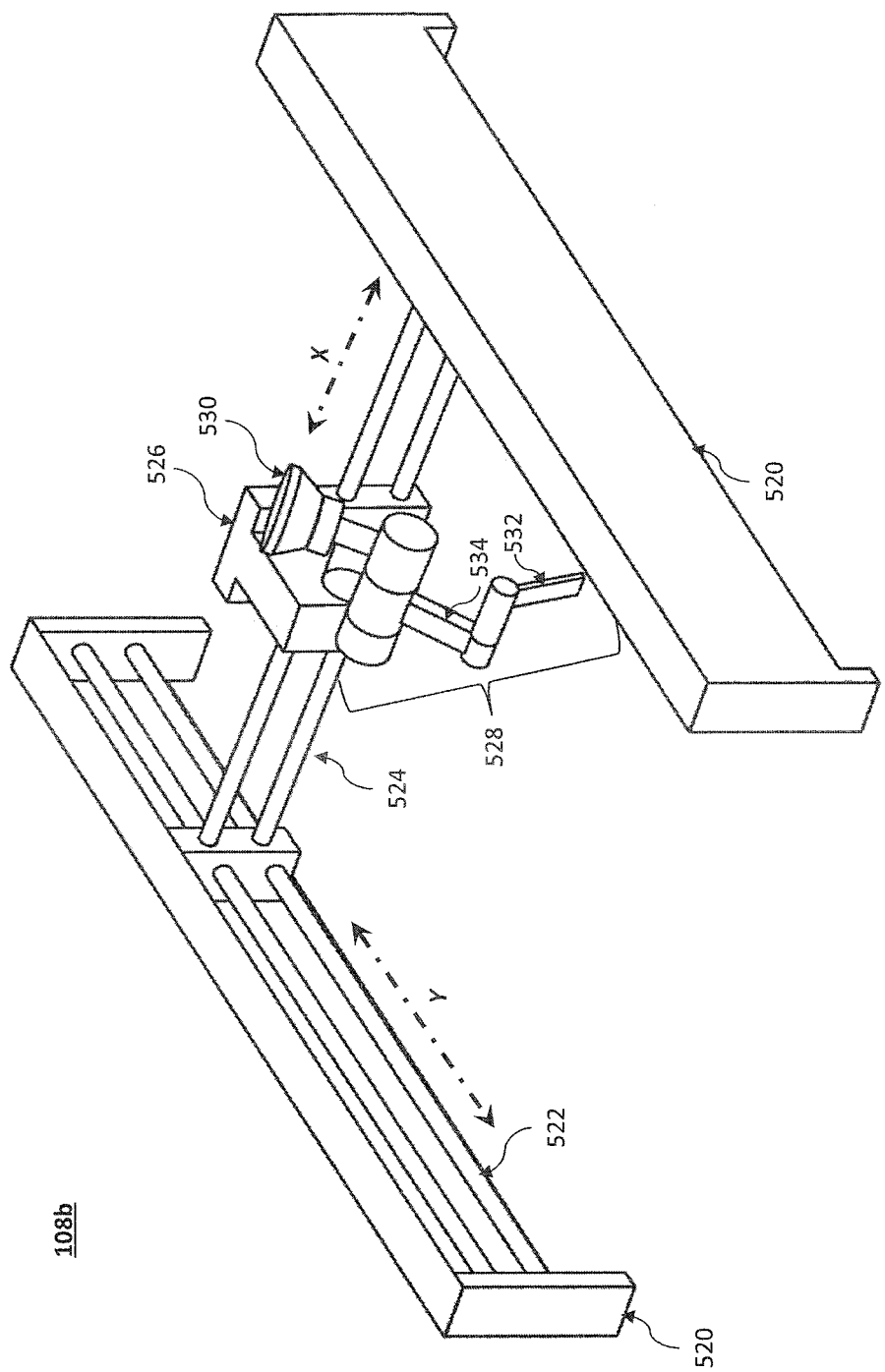
FIG. 5c illustrates an example secondary actuation system.

The secondary actuation system 108b may be provided in the form of an adaptable XY-plotter or gantry system mounted directly to the panel of interest and calibrated to the specific panel it is operating. The secondary actuation system 108b is preferably universal and resizable. An example XY-plotter is illustrated in FIG. 5c. The XY-plotter may comprise a square frame that serves as the rails 520 of the plotter, a rotatable multi-tool 528 with multiple interfaces (e.g., switch actuator 532 and knob actuator 530) capable of manipulating the controls of interest, and a control system that moves this multi-tool 526 within the frame along a Y-axis set of rails 522 and an X-axis set of rails 524.

When in use, the plotter moves the multi-tool 528 to the location, selects the correct manipulator interface, and manipulates the secondary flight control of interest. For example, the multi-tool 528 that can flip binary switches and/or covered switches using a switch actuator 532 and can twist knobs using a knob actuator 530. The switch actuator 532 and/or knob actuator 530 may be coupled to the multi-tool 528 via an articulating or rotating member, such as the rotatable switch arm 534.

When not in use, the multi-tool 526 may return to a home position (e.g., automatically navigate to a far corner) to prevent obstruction of the panel. The multi-tool 526 would be equipped with sensors (e.g., proximity sensors) such that it can move out of the way when it detects the pilot's hands. During the initial set-up of the plotter on a new aircraft, the location, type, and position of the secondary flight control panel may be encoded. Once a particular secondary flight control panel is encoded, the configuration can be saved to the aircraft data structure 208 and loaded when aircrew automation system 100 is installed in the same aircraft, or the same type of aircraft. In certain aspects, additional actuators may be provided to actuate controllers that are positioned in, for example, the foot well of the cockpit, such as foot pedals (e.g., brake and/or rudder pedals).

Figure 6:
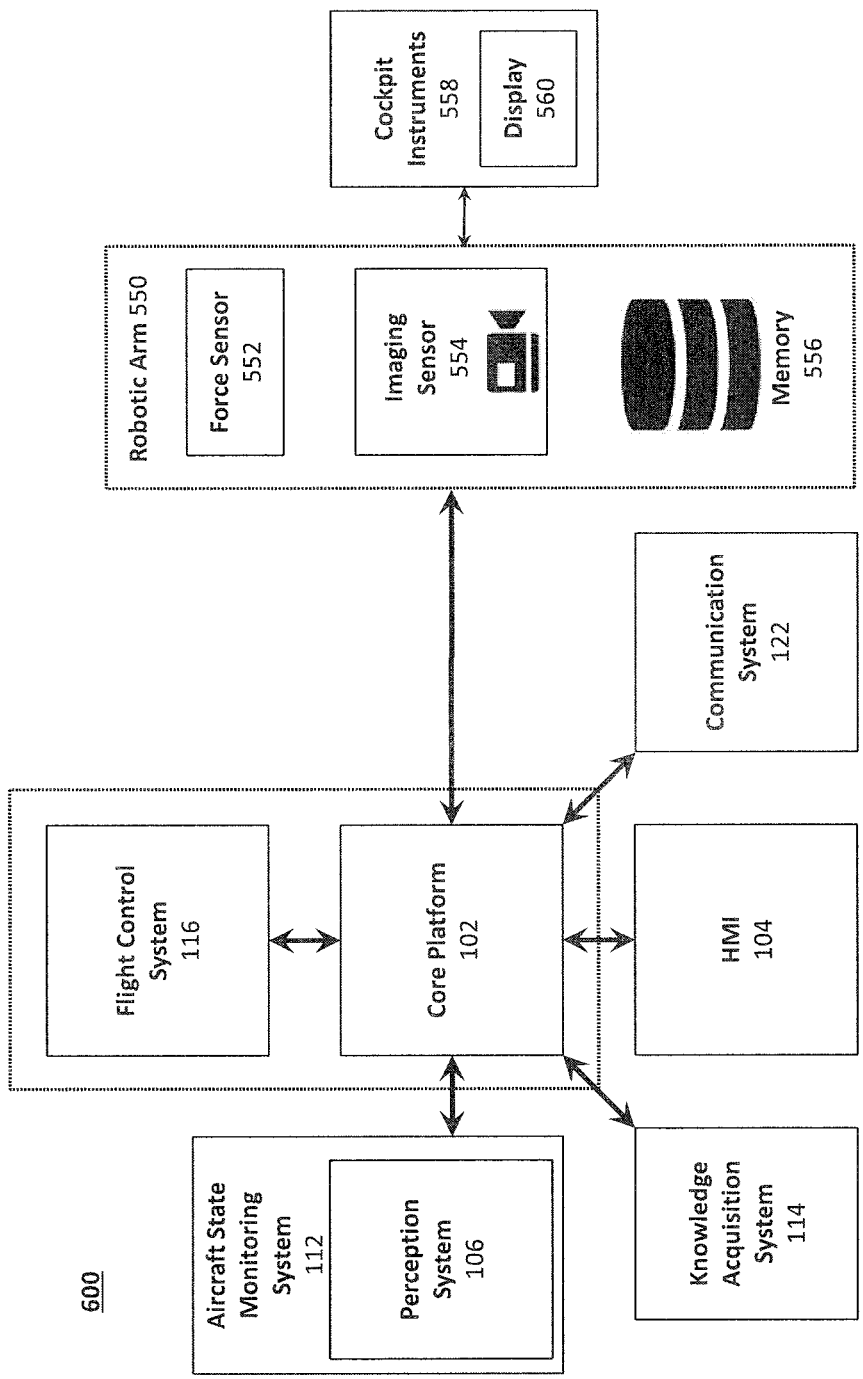
FIG. 6 illustrates a diagram of an example aircrew automation system employing a robotic arm.

Robotic Arm 550:

As provided in FIG. 6, a block diagram illustrates functional elements of the disclosed robotic system employing a robotic arm 550. Robotic arm 550 employs several features of articulating arm of FIG. 5a, for example. The interfaces and controls described with respect to articulating arm 502 are available to the robotic arm 550, as well as the additional features described herein. The robotic arm 550 can be used to replace articulating arm 502, or can be used in addition to articulating arm 502. In the example where the robotic arm 550 replaces the articulating arm 502, the robotic arm 550 is configured to provide the aforementioned functionality of the articulating arm 502, as well as the additional features described, infra.

Previous systems were limited to fixed cameras and lacked touch capacity. Disclosed is a unique architecture and method for a robotic arm comprising a functional appendage (e.g., a gripper), with imaging capabilities integrated therewith, and comparing the use of unique fiducial systems for the mobile robotic arm 550. Further, a method of implementing operations, as well as teaching robotic behaviors, is considered, by employing the disclosed robotic arm 550.

In examples provided herein, a robot system is described with integrated imaging and force sensing capabilities. In particular, a robotic arm 550 of the robot system is optimized for collecting and analyzing image and force data in order to actuate one or more processes in an automated aircraft environment.

As described herein, the robotic arm 550 described herein provides enhanced capability over conventional robotic arms, which affords the robotic system aircraft automation capabilities previously unavailable. In examples, the robot arm contains a camera used for imaging a scene of the aircraft, such as cockpit instruments 558 and corresponding displays 560. The robotic arm 550 also includes a force-sensing finger to both enable closed-loop control of a desired contact force, as well as collect contact force data during operation of the robotic arm 550.

The functional aspects of the robotic system are characterized by a force sensor 552, an imaging capture system 554 (e.g., a camera, such as the vision system), and one or more controllers to implement a variety of complex interface operations. Additionally, the robotic system communicates with one or more of a controller (e.g., flight control system 116), a routine list, a data acquisition system, and a data analysis system (e.g., for force and image data). For example, the force sensor 552 and imaging capture system 554 can provide information to a controller (e.g., core platform 102) to manipulate a cockpit instrument (e.g., a switch, a dial, a knob, etc.), ensure that the instrument is correctly identified, as well as make determinations as to the state of the instrument before, during, and after the operation. For instance, a switch can be located in a particular area of the cockpit, the distance and location being identified by the imaging system 554. Upon receiving a command to operate the switch, the controller can determine the optimal way to move the robotic arm 550 to the switch (e.g., trajectory of the robotic arm, distance from current position to the switch). The controller can further determine one or more parameters of the interaction (e.g., an expected change in state of the switch, an amount of force required to activate the switch, etc.) and monitor information from the sensors corresponding to those parameters.

In some examples, a library or matrix of parameters associated with a particular instrument (e.g., switch) can be stored in a memory 556 accessible to the controller. Although represented in FIG. 6 as being collocated with the robotic arm 550, the memory 556 can be integrated with core platform 102, remotely located (e.g., accessed by a network), etc. The monitored parameters can be compared against the library of parameters to validate the operation is carried out as expected. In one example, such as a command to actuate a switch that does not have a set of stored parameters in the memory 556 (e.g., a new and or custom instrument), the controller can build a matrix of parameters in accordance with the information acquired by the sensors during the operation. In other examples, during an operation, such as repeated actuation of a particular switch, the matrix associated with the switch can be updated and refined based on acquired data. In some examples, if the acquired information deviates from the parameters in the matrix, an alert can be sent to another system (e.g., a remote controller) or operator (e.g., a pilot), or additional information request (e.g., from another camera) to determine whether a fault has occurred, the switch is defective, the operation was unsuccessful, etc.

Integrating force and imaging capabilities to guide physical robot manipulation of the cockpit instruments 558 enables understanding and operation of complex interfaces, such as an autopilot panel or flight management system ("FMS"). The operational state of panels, systems and instruments can be captured through imaging, and validated during actuation of a button, switch, etc., by the robotic arm 550. In particular, the robotic arm 550 can confirm the trajectory, action, or state by recognizing a force or pressure profile captured by the force sensor 552.

The robotic arm-mounted camera allows for the imaging system 554 to obtain a variety of views from multiple perspectives within the cockpit. For example, in a cockpit environment, instruments can be oriented vertically, horizontally, or at various angles, to conform to the reach and position of a human operator. The camera mounted to the robotic arm 550 can view surfaces and instruments at various locations and angles within the cockpit. In this manner, the robotic arm 550 can be moved about the cockpit to view instruments that may be blocked from a static view, as well as avoiding obscuring the view of the pilot during flight. Thus, the flexibility of the robotic arm 550 described herein is a departure from statically-mounted cameras found in conventional systems, with multiple advantages as described herein.

Information from the image system 554 and force sensor 552 mounted to the robotic arm 550 can be employed to build and/or verify two- and three-dimensional models of the cockpit and associated instrumentation. In examples, the force sensor 552 provides the robotic arm 550 with the ability to verify location, position, state, etc., of the cockpit elements, which was previously only possible with imaging sensors. For instance, the information can allow the controller to determine whether a particular switch is up or down, lit or unlit, a particular color, etc.

In performance of various routines, the force sensor 552 can continuously monitor and validate the mapped scenes. In examples, performance of an action can include an expected trajectory and force. Information from the force sensor 552, in conjunction with known and/or calculated and/or estimated condition of the instruments 558 (e.g., state, associated display 560) can be used to measure and/or validate contact trajectories (e.g., as provided by one or more parameters within the matrix). For example, pushing a button will have a different contact profile than pushing against a wall, and the amount of force feedback upon contact can be used to identify the type of surface against which the force sensor 552 is acting.

This disclosure describes vision and touch capability that have been added to a manipulable appendage, set of appendages, or other end-effector attached to the robotic arm 550 (e.g., a gripper tool at an end of the robotic arm 550). These two sensor modalities expand the types of activities that the ALIAS robot arm can perform, which expands the capability of robotic arms that rely on static cameras and/or lack force sensing capabilities.

In particular, these two modalities enable the robot to identify/map/recognize/actuate the operation of complex interfaces on an aircraft, such as an Autopilot Panel or Flight Management System. Operating these panels requires conditional logic that is driven by vision (e.g., reading the screen of the FMS to deduce the state of the system). These panels may have small text or otherwise be visually occluded from camera mounting in a fixed or remote location. While visual perception has always been a key feature of the system, the use of robot-guided vision specifically towards operation of complex interfaces, provides significant advantages, enhances the system architecture, and results in expanded capabilities to ensure accuracy and depth of understanding of instruments in the cockpit environment.

For example, touch sensitivity provides a second, independent data pathway for identifying controls and verifying models of the cockpit instruments 558. In particular, the camera mounted to the robotic arm 550, in addition to other cameras, provides built-in and validation testing in real-time. For example, the continuously monitored system can verify that expected contact trajectories and force profiles are achieved to verify accurate operation of the particular instrument. In some examples, the system can employ the captured data to gauge the operational readiness of the system itself. In this manner, the monitored information can be compared against the stored parameters to validate the stored values, the ability of the system to calculate the proper trajectories, the fidelity of actuation systems, etc. If one or more parameters are found to be outside a threshold amount, an alert can be provided, a request can be made for additional information, an action can be repeated and/or undone, etc.

In some examples, the primary actuation system 108*a* was used to observe and operate the autopilot, FMS, and radio/transponder. Because of the placement and orientations throughout the cockpit, robotic arm 550 (whether the primary actuation system 108*a* or a separate robotic arm) mounted imaging capabilities enables observation of these surfaces from a single camera. The FMS, for example, may not be visible from a static camera mounting point, as the camera may be mounted behind the cockpit throttle column. Integrating image and force sensors greatly enhances flexibility to observe and interact with the interfaces (e.g., buttons, switches, knobs, screen interfaces of the FMS) and understanding different states of the instruments (e.g., an autopilot system).

Figure 7A:
FIG. 7a illustrates an example image captured by an imaging system.

In examples, the camera sends data to a controller to analyze and/or manipulate the images to create a standardized view. The standardized view can be in a format that is easily readable by one or more systems. For example, a raw camera image of a device and/or control (e.g., as shown in FIGS. 7*a* and 7*d*) can be reformatted such that elements of the image are recognizable as a panel containing one or more physical and/or virtual controls (e.g., buttons, dials, switches, etc.). Each of the one or more controls can correspond to one or more displays, such as a numerical readout.

Figure 7C:
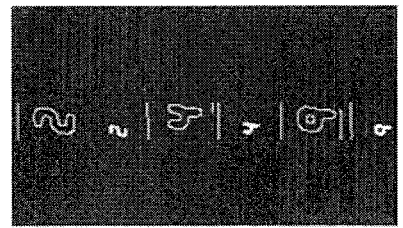
FIG. 7c illustrates an example of data extracted from the reformatted image of FIG. 7b.
Figure 7B:
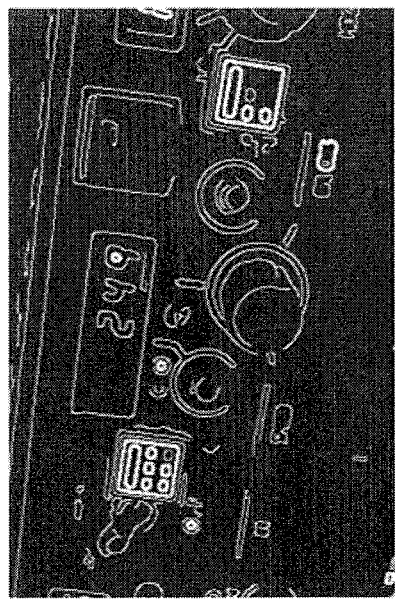
Figure 7E:
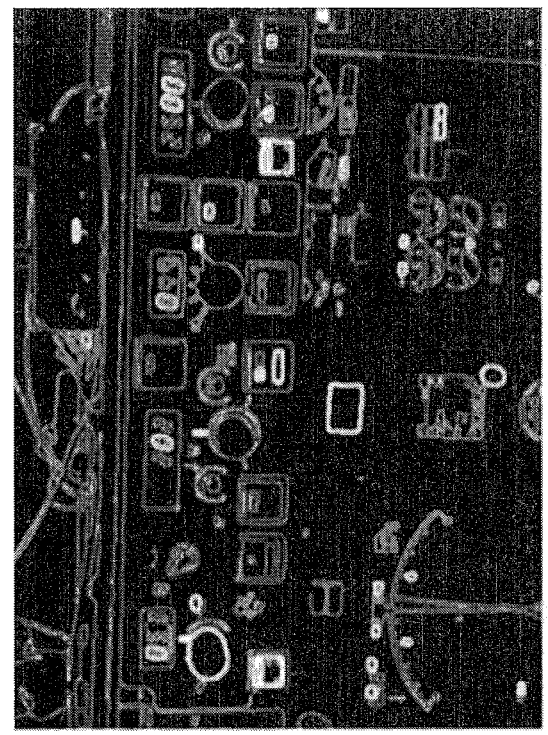
FIG. 7e illustrates an example reformatted image of the image of FIG. 7d.
Figure 7D:
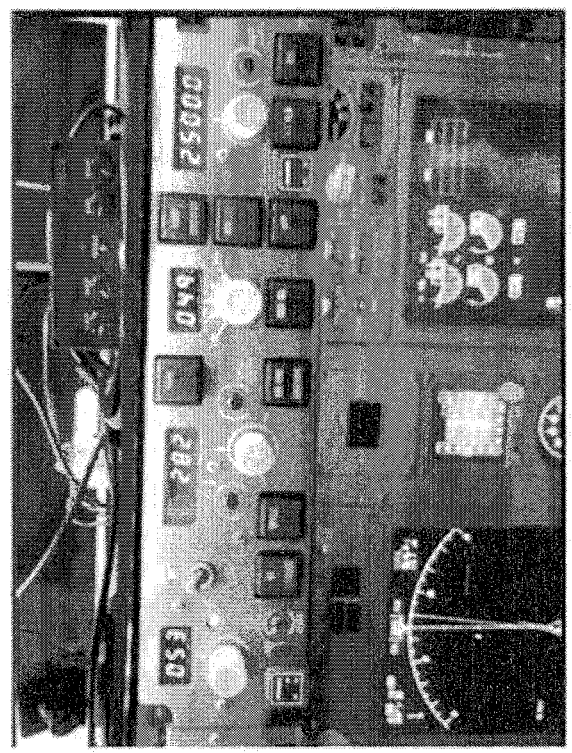
FIG. 7d illustrates another example image captured by an imaging system.

In the example illustrated in FIGS. 7*a* through 7*c*, the camera captures an image of a controls (FIG. 7*a*), and an edge-detection algorithm is performed on the image (FIG. 7*b*). Such a process can be incremented throughout the identification and/or analysis routine. As shown in FIG. 7*c*, the system is capable to recognize information presented on the controls, transformed via the edge-detection algorithm. In the example of FIG. 7c, the numerals 2, 4 and 9, captured from an LCD display on the control panel, are identified and analyzed by the RAS system. Accordingly, the information can be used to inform and control implementation of autonomous systems described herein. An additional image is shown in FIG. 7d of a set of cockpit controls. As explained above, application of an edge-detection algorithm generates a virtual, parsable image (FIG. 7e), which serves as an interim step in vision system processing and analysis.

The controller is configured to identify and digitize the controls and displays such that a computer readable output can be generated for analysis of the control system (e.g., by a processor, presented on a computer display, etc.). For instance, as the camera is collocated with the force sensor 552, the view of the cockpit instruments 558 will change with the orientation of the robotic arm 550. Thus, the controller is configured to scale and reorient one or more of the controls and/or displays to a desired layout/format/organization to enhance understanding of the imaged device, scene, instrument, etc., regardless of perspective or viewing angle. Once analysis is performed, the controller can determine whether a response is required as well as which action is appropriate based on the information.

Advantageously, the process of reformatting the image allows for the system to recognize particular controls and/or displays regardless of relative orientation. In other words, the image can be taken from any angle and/or distance from the cockpit instruments 558 yet the controller is capable of identifying and/or manipulating imaged elements to recognize, and thus compare, the instruments with a catalogue of images of known instruments. Thus, a static camera and/or a camera that is remotely located from the robotic arm 550 would not be required, providing benefits over conventional systems.

The force sensor 552 can be configured with a protuberance to actuate a switch, button, or other similar control. In some examples, the robotic arm 550 includes one or more digits capable of a range of action, such as manipulating dials, opening panels, and/or other actions that may be useful within the cockpit. For examples, one or more of the digits can have force sensing capability, to further enhance the system's capabilities.

In an example operation, a selected command may correspond to one or more data points that can be acquired and analyzed to confirm an expected contact and/or trajectory of the robotic arm 550. In an example where the targeted cockpit instrument 558 is a common rocker switch, empirical evidence can be stored as to an expected force profile as the switch is activated. For instance, the amount of force at contact will increase as the touch sensor experiences resistance from the switch. Once the initial resistance is overcome, the switch will slip into place, such that the touch sensor senses a period of little or no resistance. As the switch comes to rest, the touch sensor will maintain a level of force to ensure the switch is completely activated. The amount of force at the touch sensor will then reflect the level of force provided by the actuation arm against the switch, indicating that the switch is completely depressed.

The force data, combined with image data from the camera, is used to either map instrument layout (e.g., in a case of first impression or no data for the particular instrument), or to validate and/or refine the stored layout of the cockpit instruments 558, their relative location, function, etc.

The data mean and standard deviation of the contact trajectory can be made with data from multiple trials (e.g., from repeated attempts at pressing the "FMS Hold" button on the Volpe 737 cockpit instrumentation). The force value can be approximate, such as calculated or estimated (e.g., if no detailed calibration has been performed by the sensor). The data acquired by the force sensor 552 can be used to build a library of measured contact events. Additionally or alternatively, this library can be used to statistically define the performance of the robot in operating the instruments—i.e., for certification purposes. In this manner, touch sensing can be used to statistically define the contact forces applied to an aircraft cockpit, by logging contact events. This may benefit certification efforts. In other words, the system can use acquired data that shows a statistically-defined operational capability of the robot, for example by providing the mean and standard deviation of forces applied by the robotic arm 550 in subsequent operations. The library can also be used to compare present performance of the robot to assess the functionality of the system, as described herein.

Although imaging and force sensor data has been described as providing the information for carrying out commands, additional or alternative sensors can be used for different or redundant information gathering. In some examples, inertial movement sensors, accelerometers, mechanical measurement systems or other sensors can be used to determine the trajectory, orientation, etc., of the robotic arm 550.

The robotic arm 550 described herein can be one aspect of a more expansive robotic solution. For example, the robotic arm 550 can be part of a system installed in an aircraft or similar target system in need of automated functionality. For example, moveable robotic arms with integrated imaging and force sensors on one or more appendages are useful in operating instruments in environments where objects are visually occluded from a static mounted camera, and/or complex multi-state interfaces that require tight coupling between vision, touch and robotic movement.

At one end of the robotic arm 550, a robotic appendage, such as a gripper, can include integrated imaging and force sensors. In some examples, visual fiducial markers can be included with the cockpit instrumentation 558 to facilitate imaging capabilities and enhance location determinations. The visual fiducial markers may, for example, include a two-dimensional machine-readable marker, such as a barcode and/or a QR code. Integral to the system is software that tightly and seamlessly integrates robotic motion, force and vision modalities to generate a more complete and useful picture of the operating environment.

Figure 8A:
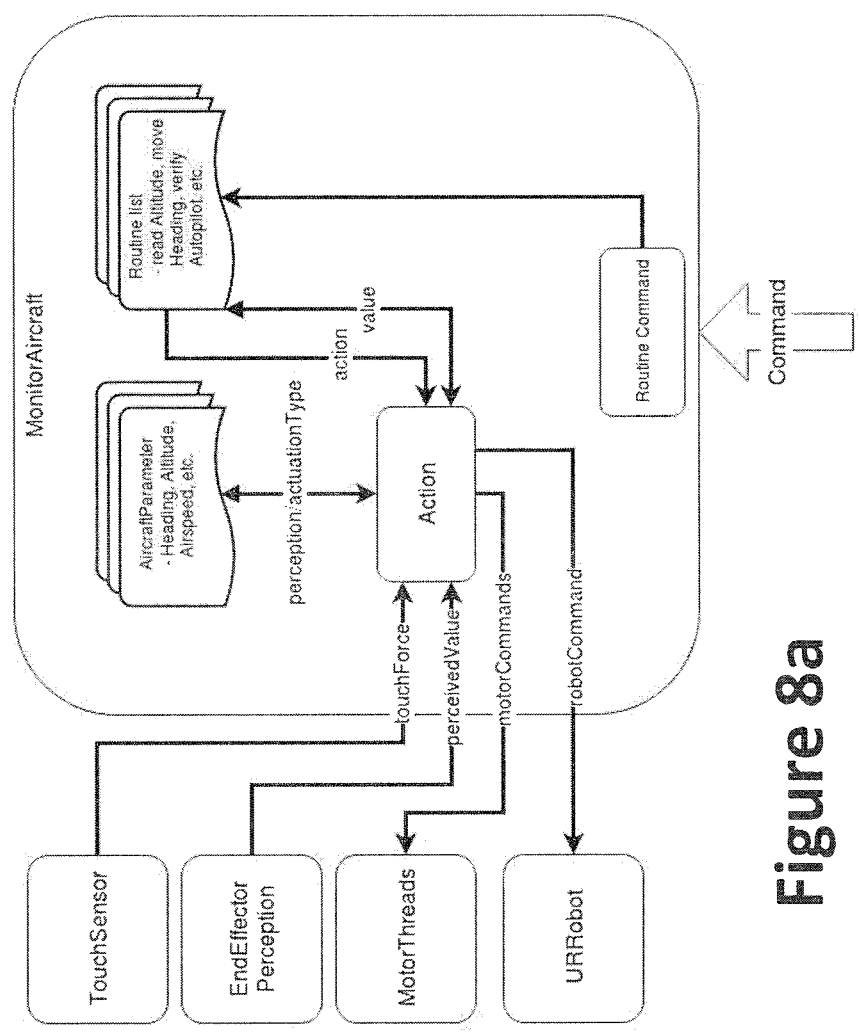
FIGS. 8a and 8b illustrate an example methods of implementing an aircrew automation system employing a robotic arm.

In example methods of operation, as illustrated in FIG. 8a, commands received from the core platform are termed "routines." Routines may require multiple steps for the robotic arm 550 to perform the selected operation, called "actions." The main function "monitorAircraft" receives commands, corresponding to one or more routines, and queues individual actions to perform the routines. A "read" action is performed by operating "EndEffector Perception" which processes image data. "TouchSensor" is called to measure a force of the digits/appendages/protuberances, etc. "MotorThreads" operates the gripper and linear rail motors, and "URRobot" operates the robotic arm 550, which is capable of operating in six-degrees of freedom about the cockpit environment.

Figure 8B:
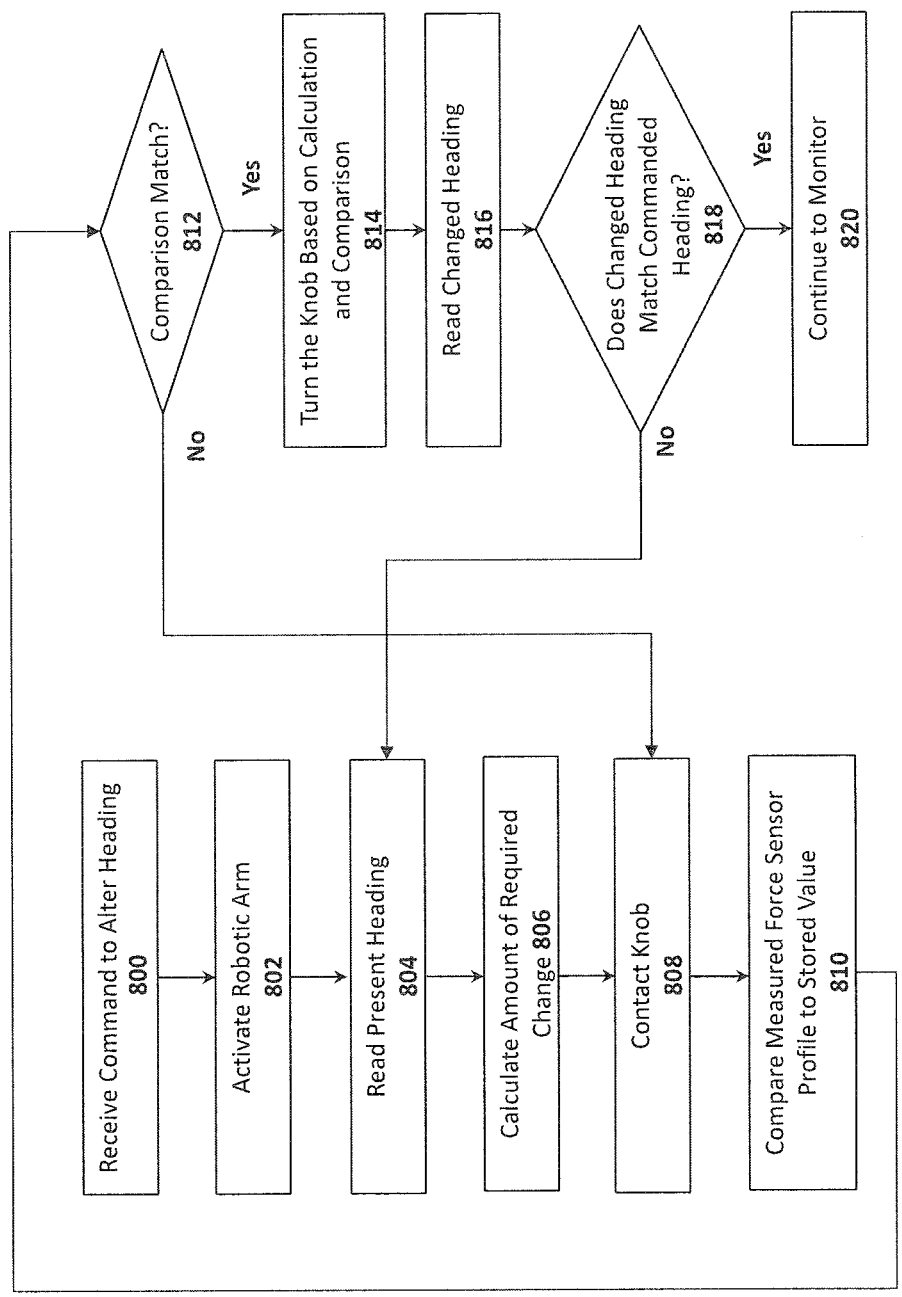

FIG. 8 represents a flowchart for an example routine for a command of "set aircraft heading to 155 degrees." This routine could be completed by using the robotic arm 550 to operate one or more cockpit instruments 558 relating to the autopilot feature (e.g., a knob to adjust the aircraft heading). An example routine consists of the following actions outlined below. At block 800, a command to alter the heading of the aircraft is provided to the system (e.g., the flight control system 116). In response, the robotic arm 550 is activated in block 802. By the imaging sensor 554, the system captures imaging data sufficient to read the present heading command on the autopilot in block 804. Based on the present heading and the commanded change in heading, the system calculates the amount of change needed (e.g., by how much to turn the knob) in block 806. In block 808, the robotic arm 550 is extended to contact (e.g., grip, touch, etc.) the knob. Based on measured sensor data from the force sensor 552, a comparison is made in block 810 of the measured data and data stored in memory 556. For example, a threshold amount of force may be needed to grip and turn a particular knob. That information may be stored in the memory 556 to ensure the action is only performed once.

At block 812, the system determines if the appropriate force is being applied to the knob. If no, then the method returns to block 808 to reestablish contact with the knob. If yes, then the method advances to block 814, where the knob is turned to effectuate the heading change. The extent to which the knob is turned is based on the calculation of the heading change, as well as the comparison. At block 816, the changed heading is read by the imaging sensor 554 to determine if the appropriate heading has been achieved. If no, the method returns to block 804 to reevaluate the original heading, the present heading, and the amount of change required, as the method advances anew. If yes, the action is complete and, at block 820, the system continues to monitor for new commands.

Generally, actions consist of either "moves" or "reads." Moves refer to movement of the robotic arm 550. Reads refer to acquiring information about the world (e.g., using image or force data). The parameters of each individual action are contained in a data structure. Note that some actions consist of multiple operations. For example, turning a knob requires a list of actions, listed in a queue: moving the robot to the knob, opening the gripper, closing the gripper, verifying a grip on the knob via feedback from the force sensor, turning the knob, and releasing the knob. A follow up validation can be performed by the imaging system 554, to ensure the desired end state of the knob has been achieved.

By enabling operation of complex cockpit interfaces (e.g., FMS) the robotic arm 550 provides expanded functionality. For example, in an aircraft which employs a robotic co-pilot, but a version of the robotic co-pilot that does not use a Flight Control System (e.g., a version of the software and/or hardware lacking a Flight Control System), the robotic arm 550 is configured to operate an autopilot, FMS and Transponder in the event of pilot incapacitation, due to the complex interaction of the modalities disclosed herein. In examples, by monitoring the force and image data collected by the respective sensors, the robotic system can self-monitor the state and/or actions of the robotic arm 550. For example, if the robotic system is commanded to move to "Position A", the imaging system 554 should observe associated Scene A. If analysis of the image data does not verify that the robotic arm 550 is viewing Scene A, the self-monitor system can obtain additional data to determine a state of the robotic arm 550, and/or run a calibration routine.

The addition of vision and touch to a robotic arm 550 develops new use-cases that were previously impossible or implausible, such as viewing a wider range of the cockpit and instruments, operating complex interfaces in the cockpit, and providing redundant methods to verify the performance of the robot arm. This installation and operation of the disclosed system is considerably less complex than conventional systems. The savings in cost and system footprint may be valuable for a variety of reasons in multiple marketplaces (e.g., in commercial, defense, general aviation, etc.).

Knowledge Acquisition System 114.

The knowledge acquisition system 114 gathers and/or generates a knowledge base necessary to enable the aircrew automation system 100 to determine aircraft specific information. This includes knowledge of aircraft performance characteristics, limitations, checklists, and procedures (including emergency procedures), and criteria that define contingencies in the aircraft. The data may be derived from a combination of encoded data (e.g., from manuals, pilot briefings, pilot operating handbook) and data acquired in flight (e.g., via sensors), which supports off-line machine-learning and trend analysis. The date to be encoded may be loaded in .xml format that describes the contents of procedures and the flow of tasks both within and between procedures.

As illustrated in FIG. 1b, for example, the knowledge acquisition system 114 may receive operational commands from the core platform 102, while sending to the core platform 102 configuration data and status and response information generated by the knowledge acquisition system 114.

The operation of the knowledge acquisition system 114 may be generally divided into three processes, including, for example, aircraft system modeling, procedure codification, and aerodynamic modeling. The aircraft system modeling process provides the aircrew automation system 100 with information about the available onboard systems and how the onboard systems are configured, actuation limits, etc. The procedure codification process provides the aircrew automation system 100 with information about aircraft operation in normal and non-normal situations. Procedure codification may include, for example, the codification of checklists. Finally, aerodynamic modeling process provides the aircrew automation system 100 with information about flying the aircraft and what performance to expect for a given aircraft type and configuration.

During the knowledge acquisition phase, the conditions under which a situation is considered an anomaly or contingency must also be established. These conditions will frequently be discrete, such as an engine over-speed or the exceedance of an airspeed limit. Using machine learning, the aircrew automation system 100 can fine-tune its aerodynamic and control models by observing a series of in-flight maneuvers flown by the pilot. This information includes flight dynamics data, operational limitations, procedures, aircraft systems, and layouts as well as other related data. In addition to written information, the aircrew automation system 100 may also codify information based on past events and experience of more experienced pilots. Machine learning enables the knowledge acquisition process to be performed efficiently and quickly.

Using aircrew automation system's 100 perception system 106 and actuation system 108, the instruments and controls in a plane cockpit or a realistic simulator are monitored as a pilot goes through the motions of a typical flight profile. Observing the pilot's actions allows the aircrew automation system 100 to learn directly from the pilot and imitate the smooth, expert control for a given operation. This process benefits from the fact that flight operations are highly structured in what is to be done in a given situation—machine learning then enables the codification of how something is to be executed.

The population of aircraft data structure 208 may be accomplished using the Extensible Markup Language ("XML"). More specifically, a XML data structure may be employed that comprises a set of fields and data trees that, when populated, allow the core platform 102 to configure and operate an aircraft. In certain aspects, the aircrew automation system 100 may employ natural language interpretation of flight documents and/or a software tool that enables a human to enter the data efficiently and accurately.

In certain aspects, a set of airplane agnostic features may be generated and coded. For example, procedures like landing gear retraction, engine out procedures on multi-engine aircraft, and stall recovery are similar across many types of aircraft and will need only minimal modification for a particular airframe. Moreover, basic airframe limitations (such as never exceed speeds) need only be entered as specific numbers and can be entered from flight manuals in a nominal period of time.

Procedure Editor.

The aircraft specific information may be gathered during a transition period using, for instance, written documentation (e.g., pilot operating handbook, maintenance manual, etc.) as well as through direct monitoring of aircraft operations. The output of this knowledge acquisition process is the aircraft data structure 208, which is described above with regard to the core platform 102. Contained in this aircraft data structure 208 may be operational procedures, available systems and their designs, cockpit layout, and all other information necessary for safe operation of the aircraft. In certain aspects, an aircrew automation software development kit may allow a software/flight controls engineer to specify, code, and unit-test one aircraft subsystem (e.g., electrical or hydraulic) per day. The aircrew automation software development kit can provide tools for turning the flight manual's procedures into state machines compatible with Matlab State Flow and Simulink, which can then auto-code the procedures in C for inclusion in the core platform 102. The aircrew automation software development kit may also generate test code for the unit-level as well as interfaces for testing to the core platform 102. For example, the procedure editor may provide a list of tasks where the pilot may select whether the aircrew automation system 100 or the pilot is responsible for a given task on the list.

Knowledge Acquisition of Flight Control.

A first step in knowledge acquisition of flight control uses the Athena Vortex Lattice ("AVL") method to generate the mathematical model in the form of non-dimensional stability derivatives that is used and refined during the flight with the pilot. Once the primary flight control mechanisms are calibrated, the system ID trainer application may be used to perform a sequence of flight maneuvers designed to identify specific stability derivatives. The data is automatically processed into updated stability derivatives for use in the controller. The controller may employ an auto-tuner. The same updated stability derivatives are used in a 6-DOF simulation as a validation step that the controllers perform adequately prior to flight. An additional benefit of performing knowledge acquisition of flight control is that it enables the refinement and incorporation of a great deal of formal procedural knowledge. Although the procedures lay out the individual steps, fine detail on how such steps are to be executed may be missing (e.g., how long to wait between steps or how sharply to increase throttle).

Reverse Engineer of Aircraft Flight Performance Characteristics.

Aircraft performance characteristics that can be measured through on-board data-acquisition units are generally considered proprietary by the aircraft and avionic manufacturers. This information can be utilized for flight simulations, aircraft health monitoring, aircraft development, and much more. Currently, third parties wanting to utilize the on-board data acquisition are restricted by its proprietary nature. This restriction has only been partially been overcome through the use of stand-alone aircraft sensor suites. These commercially available sensor suites only measure a fraction of the data available through cockpit instrumentation and pilot inputs. However, because the aircrew automation system 100 utilizes a variety of sensors to determine the aircraft flight performance characteristics, it effectively reverse engineers the air vehicle performance characteristics. The aircrew automation system 100 collects aircraft information through a combination of stand-alone sensors, data capture through images of cockpit instrument, and input controls.

Example

Aspects of the present disclosure may be illustrated through the following example flight plan, which illustrates how aircrew automation system 100 may interact with the pilot, execute a flight plan, execute flight operational tasks, and respond to contingencies during system engagement and takeoff, flight plan engagement, and anomaly detection & handling. The present teachings, however, should not be limited to those used in this example.

System Engagement and Takeoff.

The pilot gets into the left seat of an aircraft, fastens the seat belt, positions the human-machine interface 126 comfortably at his side, and activates the aircrew automation system 100 application. The application boots and runs through a series of power-on diagnostics and the mechanical interfaces power up and calibrate. A message may be displayed upon the human-machine interface 126 confirming a successful test and queries the pilot to confirm engagement of aircrew automation system 100. The pilot selects the day's flight plan via the applications tab 334. The aircrew automation system 100 may be used for checklist monitoring. The pilot selects engine start, and aircrew automation system 100 may begin a sequence of engine start actions, asking for final confirmation before actually starting. Meanwhile, the pilot may call the tower for clearance and receives a flight plan to the training area.

When engine start is complete, the aircrew automation system 100 may report success to the pilot and report, for example, "ready to taxi," (either audibly or via the human-machine interface 126). The pilot calls for a taxi clearance and upon hearing it, the aircrew automation system 100 transcribes the taxi clearance and displays it to the pilot for confirmation. The pilot then hits the "taxi via clearance" button on the application and aircrew automation system 100 taxis to the assigned runway while the pilot monitors for traffic. When at the runway threshold, the pilot verbally commands the aircrew automation system 100 to perform a pre-takeoff check and the system completes all necessary checks, prompting the pilot to manually double-check critical items, such as flight controls. For example, the aircrew automation system 100 may monitor the human operator's execution of a checklist, and output "checklist complete" or identify a flight plan or error.

Upon receiving further clearance, the pilot then commands the aircrew automation system 100 to guide the aircraft to line-up and wait, and then ultimately takeoff. The aircrew automation system 100 pushes the throttles forward via the primary actuation system 108a, visually checks engine and cockpit indicators via the perception system 106, calls out speeds via the HMI system 104, and rotates at the speed appropriate to the current weight, balance, and density altitude. The pilot keeps his hand on the stick/yoke 514 to confirm aircrew automation system's 100 inputs and retain his muscle memory. The aircrew automation system 100 confirms aircraft performance according to current conditions and reports any deviation from expected climb rate. The pilot's workload is reduced by the aircrew automation system 100 during climb, enabling more heads-up time (i.e., eyes forward, not on the instruments) to look for traffic in the busy airspace. The aircrew automation system 100 may also provide experienced pilot advice for a given checklist, aircraft, or location. For example, in a particular airport, the aircrew automation system 100 may instruct the human operator with airport specific tips, such as "steep departure angle from this runway."

Flight Plan Engagement.

At the top of climb, the aircrew automation system 100 levels off the aircraft and adjusts trim and power settings while heading to the first waypoint in the flight plan. During cruise, the aircrew automation system 100 continues to visually monitor all cockpit displays, constantly comparing engine and aircraft performance against expected values and alerting the pilot to any deviations.

The aircraft arrives at the training area and begins the day's flight plan. During the flight plan, however, the aircraft enters a towering cumulus cloud, where instrument meteorological conditions ("IMC") conditions are at below freezing temperatures. The pilot requests and receives clearance from the ground, via an internet relay chat ("IRC") chat window on the human-machine interface 126, to climb to 24,000 feet to get above the weather. In certain aspects, the aircrew automation system 100 request clearance from the ground.

Anomaly Detection & Handling.

After a period of time, the aircrew automation system 100 may detect that given the climb, the indicated airspeed is slowly deviating from its modeled airspeed for these pitch and power settings, indicating lower than expected values. This is an indication that the pitot heater has failed and the pitot tubes have iced up. The pilot has fewer than 100 hours flying the aircraft and is not aware that pitot heaters in this model are known to be unreliable. The pilot has not yet noticed that the airspeed indicator is trending below nominal.

The aircrew automation system 100, however, recognizes that the airspeed data is anomalous to the rest of the flight data and its internal flight dynamics model, and aurally warns the pilot "airspeed indicator fault." While the pilot recognizes that the airspeed information is currently unreliable, he is unsure as to whether the aircraft is flying faster or slower than the indicator shows.

Drawing on a database of prior anomalies, the aircrew automation system 100 presents a set of procedural options and highlights the minimum safe altitude for the area (e.g., 8,000 ft). The pilot chooses the most conservative option, which results in wings level, pitch, and power descent to a lower altitude (e.g., 10,000 ft). The aircrew automation system 100 eases back on the power, pitches slightly down, and commences the descent. While descending through 15,000 feet the pitot tubes again come online. Once stable at 10,000 feet, the aircrew automation system 100 holds the aircraft straight and level while the pilot assesses the situation prior to returning to the flight plan.

Upon competition of the day's flight plan, the aircrew automation system 100 may execute an automatic landing procedure. For example, the aircrew automation system 100 may navigate the aircraft to a predetermined waypoint, where the aircraft may commence its initial descent. During the descent, the aircrew automation system 100 may monitor the flight conditions and locate the runway. Upon final approach, the aircrew automation system 100 may slow the aircraft down and ultimately land the aircraft. If the aircrew automation system 100 determines that landing is not feasible (e.g., an obstruction or unacceptable flight conditions), the aircrew automation system 100 may commence a missed approach routine or other contingency routine. For example, the aircrew automation system 100 may retry landing at the same location or navigate the aircraft to an alternative landing location. An example system for landing an aircraft at an alternative landing location is disclosed by commonly owned U.S. Patent Publication No. 2015/0323932, titled "Autonomous Cargo Delivery System."

The aircrew automation system 100 and derivative technologies may be applied across a wide range of aircraft and flight simulators. The derived flight performance characteristics from an aircraft flight test can be used to improve the fidelity of flight simulators used to train pilots. Providing flight simulators access to actual aircraft performance data has tremendous value for flight simulator operators. Another benefit of aircrew automation system 100 is its ability to synthesize flight performance characteristics when aircraft are modified for special flight plans such as the addition of sensors and antennas that can affect aerodynamic performance and flight handling qualities (e.g., aircraft development). In addition, the data captured by the aircrew automation system 100 can be used for aircraft health monitoring, using prognostics to sense maintenance needs.

The aircrew automation system 100 furthers the safety and utility of commercial aviation operations while providing significant savings in human operating costs. For example, the aircrew automation system 100 may be applied to long-haul air cargo carriers to increase safety and efficiency as well the cost-savings of this advanced pilot-assist technology. Further, the ultimate state machine, for example, may serve as a training tool for pilots in-flight, or as a safety system, providing a second set of eyes in what would traditionally be a single-pilot aircraft. Portions of the human-machine interface 126 streamline all piloted flight operations, even multi-crew operations.

The above-cited patents and patent publications are hereby incorporated by reference in their entirety. Although various embodiments have been described with reference to a particular arrangement of parts, features, and like, these are not intended to exhaust all possible arrangements or features, and indeed many other embodiments, modifications, and variations may be ascertainable to those of skill in the art. Thus, it is to be understood that the invention may therefore be practiced otherwise than as specifically described above.

What is claimed is:

1. An aircrew automation system for use in an aircraft, the aircrew automation system comprising:
a computer system having a processor and one or more interfaces to connect a plurality of systems or subsystems, wherein the computer system is communicatively coupled with a flight control system of the aircraft and is configured to generate commands based at least in part on flight situation data received from (1) one or more of the plurality of systems or subsystems or (2) the flight control system; and an actuation system operatively coupled with the computer system via at least one of the one or more interfaces, wherein the actuation system comprises:
an optical sensor configured to visually identify one or more cockpit instruments corresponding to the flight control system;
an actuator configured to engage the one or more cockpit instruments;
a force sensor operably coupled to the actuator and configured to measure a force when the actuator makes contact with the one or more cockpit instruments; and
a controller operably coupled with the optical sensor, the actuator, and the force sensor, wherein the controller is configured (1) to map a location, type, and position of the one or more cockpit instruments as a function of data collected by the optical sensor and the force sensor, (2) to execute the commands received from the computer system via the actuator, and (3) to communicate data collected by the optical sensor or the force sensor to the computer system.

2. The aircrew automation system of claim 1, wherein the optical sensor is an infrared camera or a visual camera.

3. The aircrew automation system of claim 1, wherein the actuator comprises two or more digits that are individually manipulable.

4. The aircrew automation system of claim 3, wherein each of the two or more digits comprises a respective force sensor.

5. The aircrew automation system of claim 1, wherein the actuator is a robotic arm configured to maneuver in six degrees of freedom within a cockpit environment.

6. The aircrew automation system of claim 5, wherein the optical sensor and the force sensor are collocated at a distal end of the robotic arm, the distal end being configured to make contact with the one or more cockpit instruments.

7. The aircrew automation system of claim 1, further comprising a knowledge acquisition system operatively coupled with the computer system via at least one of the one or more interfaces to determine information specific to the aircraft.

8. The aircrew automation system of claim 7, wherein the knowledge acquisition system is configured to access a matrix of force values corresponding to a force profile of the one or more cockpit instruments.

9. The aircrew automation system of claim 8, wherein the controller is configured to compare measured data from the force sensor to the matrix of force values to identify a cockpit instrument of the one or more cockpit instruments based on a respective force profile.

10. The aircrew automation system of claim 7, wherein the knowledge acquisition system is configured to access a database containing a matrix of image data corresponding to a layout of the one or more cockpit instruments.

11. The aircrew automation system of claim 10, wherein the controller is configured to compare measured data from the optical sensor to the matrix of image data to identify a cockpit instrument of the one or more cockpit instruments based on a location of the cockpit instrument according to the layout.

12. The aircrew automation system of claim 1, further comprising a perception system operatively coupled with the computer system via at least one of the one or more interfaces to monitor the one or more cockpit instruments of the aircraft to generate flight situation data.

13. The aircrew automation system of claim 1, further comprising a human machine interface operatively coupled with the computer system via at least one of the one or more interfaces to provide an interface between a pilot and the aircrew automation system to display data to and accept commands from the pilot.

14. The aircrew automation system of claim 13, wherein the human machine interface includes a touch screen display.

15. The aircrew automation system of claim 1, wherein the actuator is a multi-tool configured to interact with a knob-style cockpit instrument and a switch-style cockpit instrument.

16. A method of implementing an aircrew automation system for use in an aircraft, the method comprising:
receiving a commanded heading from a flight control system of the aircraft to alter aircraft heading;
identifying, via an optical sensor, a knob amongst one or more cockpit instruments that is configured to alter aircraft heading;
activating a robotic arm configured to manipulate the one or more cockpit instruments;
controlling the robotic arm to engage the knob;
determining that a measured force profile for the knob matches a stored force profile value; and
turning the knob to reflect the commanded heading.

17. The method of claim 16, further comprising the step of reading a first heading before contacting the knob.

18. The method of claim 17, further comprising the step of calculating an amount of change required to achieve the commanded heading based on the reading of the first heading and the commanded heading.

19. The method of claim 16, further comprising the steps of:
reading a second heading after turning the knob; and
comparing the second heading to the commanded heading.

20. The method of claim 19, further comprising the steps of:
determining the second heading does not match the commanded heading; and
calculating a second amount of change required to achieve the commanded heading based on the reading of the second heading and the commanded heading.

* * * * *